United States Patent
Lu et al.

(10) Patent No.: US 9,809,009 B2
(45) Date of Patent: Nov. 7, 2017

(54) MULTIPLE LAYER INTERLAYER HAVING IMPROVED OPTICAL AND SOUND INSULATION PROPERTIES

(71) Applicant: Solutia Inc., St. Louis, MO (US)

(72) Inventors: Jun Lu, East Longmeadow, MA (US); Wenjie Chen, Amherst, MA (US); Curtis Schilling, III, Kingsport, TN (US); John D'Errico, Glastonbury, CT (US); Weihong Cui, Longmeadow, MA (US); Zhou Li, Northborough, MA (US); Jeffrey B. Hurlbut, West Springfield, MA (US)

(73) Assignee: Solutia Inc., St. Louis, MO (US)

( * ) Notice: Subject to any disclaimer, the term of this patent is extended or adjusted under 35 U.S.C. 154(b) by 395 days.

(21) Appl. No.: 14/563,622

(22) Filed: Dec. 8, 2014

(65) Prior Publication Data
US 2016/0159050 A1    Jun. 9, 2016

(51) Int. Cl.
| B32B 27/08 | (2006.01) |
| B32B 27/22 | (2006.01) |
| B32B 7/02 | (2006.01) |
| B32B 27/30 | (2006.01) |

(52) U.S. Cl.
CPC .......... B32B 27/08 (2013.01); B32B 7/02 (2013.01); B32B 27/22 (2013.01); B32B 27/306 (2013.01); B32B 2250/246 (2013.01); B32B 2270/00 (2013.01); B32B 2307/102 (2013.01); B32B 2307/418 (2013.01); B32B 2307/558 (2013.01); B32B 2307/56 (2013.01); B32B 2419/00 (2013.01); B32B 2457/12 (2013.01); B32B 2605/00 (2013.01); B32B 2605/18 (2013.01)

(58) Field of Classification Search
None
See application file for complete search history.

(56) References Cited

U.S. PATENT DOCUMENTS

| 2,282,026 | A | 5/1942 | Bren et al. |
| 2,282,057 | A | 5/1942 | Hopkins et al. |
| 2,456,366 | A | 12/1948 | Bren et al. |
| 3,644,594 | A | 2/1972 | Mont |
| 4,361,625 | A | 11/1982 | Beckmann et al. |
| 4,874,814 | A | 10/1989 | Cartier |
| 4,968,744 | A | 11/1990 | Misra et al. |
| 5,169,897 | A | 12/1992 | Walls |
| 5,190,826 | A | 3/1993 | Asahina et al. |
| 5,290,660 | A | 3/1994 | Eian et al. |
| 5,340,654 | A | 8/1994 | Ueda et al. |
| 5,409,734 | A | 4/1995 | Lee et al. |
| 5,593,786 | A | 1/1997 | Parker et al. |
| 5,728,472 | A | 3/1998 | D'Errico |
| 5,830,568 | A | 11/1998 | Kondo |
| 6,733,872 | B2 | 5/2004 | Nagai |
| 6,984,679 | B2 | 1/2006 | Papenfuhs et al. |
| 7,121,380 | B2 | 10/2006 | Garnier et al. |
| 7,452,608 | B2 | 11/2008 | Fukatani et al. |
| 7,510,771 | B2 | 3/2009 | Lu |
| 7,854,993 | B2 | 12/2010 | Lu |
| 7,883,761 | B2 | 2/2011 | Bourcier et al. |
| 8,470,908 | B2 | 6/2013 | Frank |
| 8,597,792 | B2 | 12/2013 | Meise et al. |
| 8,715,815 | B2 | 5/2014 | Shimamoto |
| 8,741,439 | B2 | 6/2014 | Shimamoto et al. |
| 8,920,930 | B2 | 12/2014 | Meise et al. |
| 9,114,595 | B2 | 8/2015 | Bourcier et al. |
| 9,238,354 | B2 | 1/2016 | Iwamoto |
| 2003/0139520 | A1 | 7/2003 | Toyoma |
| 2004/0065229 | A1 | 4/2004 | Papenfuhs et al. |
| 2004/0219365 | A1 | 11/2004 | Yuan |
| 2005/0142332 | A1 | 6/2005 | Sauer |
| 2006/0210776 | A1 | 9/2006 | Lu et al. |
| 2007/0036956 | A1 | 2/2007 | Chen et al. |
| 2007/0122629 | A1 | 5/2007 | Chen et al. |
| 2007/0148472 | A1 | 6/2007 | Masaki et al. |
| 2007/0248809 | A1 | 10/2007 | Haldeman et al. |
| 2007/0289693 | A1 | 12/2007 | Anderson et al. |
| 2008/0268270 | A1 | 10/2008 | Chen et al. |
| 2008/0280076 | A1 | 11/2008 | Hayes et al. |
| 2008/0286542 | A1 | 11/2008 | Hayes et al. |
| 2008/0306190 | A1 | 12/2008 | Weiss |
| 2009/0226750 | A1 | 9/2009 | Lu |

(Continued)

FOREIGN PATENT DOCUMENTS

| DE | 10343385 A1 | 4/2005 |
| DE | 102008001512 A1 | 11/2009 |

(Continued)

OTHER PUBLICATIONS

ChemicalBook, Triethylene glycol bis(2-ethylhexanoate), Access Jul. 13, 2015 by Examiner, First Page.
Ellis, Bryan and Ray Smith. "Polymers—A Property Database ($2^{nd}$ Edition)", Dec. 2009, Taylor & Francis, $2^{nd}$ Edition, p. 573.
Office Action dated Jul. 6, 2015 received in co-pending U.S. Appl. No. 14/299,975.
Office Action dated Jul. 8, 2015 received in co-pending U.S. Appl. No. 14/299,945.
Office Action dated Jul. 27, 2015 received in co-pending U.S. Appl. No. 14/505,191.
Office Action dated Jul. 27, 2015 received in co-pending U.S. Appl. No. 14/505,247.
Office Action dated Aug. 5, 2015 received in co-pending U.S. Appl. No. 14/300,612.
USPTO Notice of Allowance dated Sep. 9, 2015 for copending U.S. Appl. No. 14/299,996.

(Continued)

*Primary Examiner* — Sheeba Ahmed
(74) *Attorney, Agent, or Firm* — Michelle Bugbee

(57) ABSTRACT

Multilayered interlayers having good acoustic properties comprising a stiff skin layer(s) and a soft core layer(s) are disclosed. The multilayered interlayers comprise: a first polymer layer (skin layer) comprising plasticized poly(vinyl acetal) resin; a second polymer layer (core layer) comprising plasticized poly(vinyl acetal) resin; wherein at least one plasticizer is a high refractive index plasticizer. The multilayered interlayers have low mottle and resist mottle formation.

20 Claims, No Drawings

(56) References Cited

U.S. PATENT DOCUMENTS

| | | | |
|---|---|---|---|
| 2009/0233090 A1 | 9/2009 | Wong | |
| 2009/0293952 A1 | 12/2009 | Koran et al. | |
| 2010/0028642 A1* | 2/2010 | Steuer | B32B 17/10761 428/220 |
| 2010/0040868 A1 | 2/2010 | Fukatani et al. | |
| 2010/0124647 A1 | 5/2010 | Keller et al. | |
| 2012/0133764 A1 | 5/2012 | Hurlbut | |
| 2012/0263958 A1 | 10/2012 | Iwamoto et al. | |
| 2012/0288722 A1 | 11/2012 | Iwamoto | |
| 2013/0022824 A1 | 1/2013 | Meise et al. | |
| 2013/0022825 A1 | 1/2013 | Meise et al. | |
| 2013/0157065 A1 | 6/2013 | Shimamoto et al. | |
| 2013/0189527 A1 | 7/2013 | Meise et al. | |
| 2013/0236693 A1 | 9/2013 | Lu | |
| 2013/0236711 A1 | 9/2013 | Lu | |
| 2013/0274396 A1 | 10/2013 | Arendt et al. | |
| 2013/0323516 A1 | 12/2013 | Shimamoto et al. | |
| 2014/0000977 A1 | 1/2014 | Matsuda et al. | |
| 2014/0363651 A1 | 12/2014 | Lu et al. | |
| 2014/0363652 A1 | 12/2014 | Lu et al. | |
| 2014/0364549 A1 | 12/2014 | Lu et al. | |
| 2014/0364550 A1 | 12/2014 | Lu | |
| 2015/0158276 A1 | 6/2015 | Thompson et al. | |
| 2015/0258747 A1 | 9/2015 | Miyai | |
| 2015/0306853 A1 | 10/2015 | Beekhuizen | |
| 2016/0046783 A1 | 2/2016 | Asanuma | |
| 2016/0046784 A1 | 2/2016 | Asanuma | |

FOREIGN PATENT DOCUMENTS

| | | |
|---|---|---|
| JP | 05-104687 A | 4/1993 |
| JP | 05-310449 A | 11/1993 |
| JP | 09-156967 A | 6/1997 |
| WO | WO 2010/108975 A1 | 9/2010 |
| WO | WO 2012/092366 | 7/2012 |

OTHER PUBLICATIONS

Copending U.S. Appl. No. 14/882,317, filed Oct. 13, 2015, Jun Lu, et al.
Office Action dated Nov. 2, 2015 received in co-pending U.S. Appl. No. 14/514,641.
http://www.chemicalbook.com/ChemicalProductProperty_EN_CB0225180.htm; Jul. 2011
Dupont, Untitled [discloses comparisons between PVB and SGP interlayers used in safety glass], accessed on Sep. 12, 2016, Dupont.com, obtained from http://www2.dupont.com/Building_Innovations/zh_CN/assets/downloads/SGPintro_E.pdf.
PubChem, Glutaraldehyde, accessed on Sep. 12, 2016, NIH.gov, obtained from https://pubchem.ncbi.nlm.nih.gov/compound/glotaraldehyde#section=Top.
Sigma-Aldrich, Tri(ethylene glycol) bis(2-ethylhexanoate), accessed on Sep. 12, 2016, Sigmaaldrich.com, obtained from http://www.sigmaaldrich.com/catalog/product/aldrich/525103?lang-en®ion=US.
AzoM, Indium Tin Oxide (ITO) —Properties and Applications, Jan. 23, 2004, AzO Materials, obtained from http://www.azom.com/article.aspx?ArticleID=2349.
"Aerosil MOX 170 MSDS"; Evonik Industries, Jun. 25, 2016; pp. 1-12.
Office Action dated Oct. 4, 2016 received in co-pending U.S. Appl. No. 14/299,945.
Office Action dated Aug. 22, 2016 received in co-pending U.S. Appl. No. 14/563,347.
Office Action dated Aug. 12, 2016 received in co-pending U.S. Appl. No. 14/563,364.
Office Communication received in co-pending U.S. Appl. No. 14/563,372 notification dated Aug. 3, 2016.
Copending U.S. Appl. No. 15/246,810, filed Aug. 25, 2016; Jun Lu et al.
Notice of Allowance and Fee(s) Due dated Aug. 12, 2016 received in co-pending U.S. Appl. No. 15/051,222.
Copending U.S. Appl. No. 15/248,502, filed Aug. 26, 2016; Jun Lu.
Office Action dated Sep. 16, 2016 received in co-pending U.S. Appl. No. 14/563,011.
Sigma-Aldrich®. "Poly(3-methyl-1,5-pentanediol Adipate)," Retrieved Apr. 11, 2016, p. 1.
Sigma-Aldrich "Di(propylene glycol) dibenzoate" retrieved Jul. 1, 2016, 3 pages.
Office Action dated Dec. 3, 2015 received in co-pending U.S. Appl. No. 14/299,945.
USPTO Notice of Allowance dated Nov. 20, 2015 for copending U.S. Appl. No. 14/300,612.
Copending U.S. Appl. No. 14/973,547, filed Dec. 17, 2015, Jun Lu.; now U.S. Publication No. 2016/0102181.
Office Action dated Nov. 30, 2015 received in co-pending U.S. Appl. No. 14/299,975.
Copending U.S. Appl. No. 14/973,500, filed Dec. 17, 2015, Lu et al.; now U.S. Publication No. 2016/0101605.
Co-pending U.S. Appl. No. 14/563,347, filed Dec. 8, 2014;Jun Lu and Yalda Farhoudi; now U.S. Publication No. 2016-0160025.
Office Action dated Jan. 21, 2016 received in co-pending U.S. Appl. No. 14/563,347.
Office Action dated May 2, 2016 received in co-pending U.S. Appl. No. 14/563,347.
Office Action dated Nov. 6, 2015 received in co-pending U.S. Appl. No. 14/563,372.
Office Action dated Mar. 22, 2016 received in co-pending U.S. Appl. No. 14/563,372.
USPTO Notice of Allowance dated Apr. 20, 2016 for copending U.S. Appl. No. 14/563,372.
USPTO Notice of Allowance dated Feb. 5, 2016 for copending U.S. Appl. No. 14/514,641.
Copending U.S. Appl. No. 15/051,222, filed Feb. 23, 2016, Jun Lu; now U.S. Publication No. 2016-0171961.
Office Action dated Jun. 15, 2016, 2016 received in co-pending U.S. Appl. No. 15/051,222.
Office Action dated Apr. 21, 2016 received in co-pending U.S. Appl. No. 14/505,191.
Office Action dated Dec. 31, 2015 received in co-pending U.S. Appl. No. 14/505,247.
Office Action dated Apr. 22, 2016 received in co-pending U.S. Appl. No. 14/505,247.
USPTO Notice of Allowance dated Nov. 24, 2015 for copending U.S. Appl. No. 14/299,996.
Copending U.S. Appl. No. 15/051,183, filed Feb. 23, 2016, Spangler et al.; now U.S. Publication No. 2016-0168353.
PCT International Search Report and Written Opinion dated Jan. 26, 2016 for International Application No. PCT/US2015/063907.
PCT International Search Report and Written Opinion dated May 23, 2016 for International Application No. PCT/US2015/063908.
PCT International Search Report and Written Opinion dated Jan. 26, 2016 for International Application No. PCT/US2015/063885.
PCT International Search Report and Written Opinion dated Jan. 7, 2016 for International Application No. PCT/US2015/055633.
PCT International Search Report and Written Opinion dated Nov. 19, 2015 for International Application No. PCT/US2015/051591.
PCT International Search Report and Written Opinion dated Nov. 19, 2015 for International Application No. PCT/US2015/051593.
PCT International Search Report and Written Opinion dated Apr. 18, 2016 for International Application No. PCT/US2015/063933.
PCT International Search Report and Written Opinion dated Mar. 29, 2016 for International Application No. PCT/US2015/063944.
PCT International Search Report and Written Opinion dated Jan. 26, 2016 for International Application No. PCT/US2015/063975.
Notification of Transmittal of the International Search Report and the Written Opinion of the International Searching Authority, or the Declaration dated Jul. 1, 2016 received in International Application No. PCT/US201/063900.
Office Communication notification dated Jul. 11, 2016 received in U.S. Appl. No. 14/587,702.
Wade, B.E., Vinyl Acetal Polymers, in Encyclopedia of Polymer Science & Technology, 3rd edition, vol. 8, pp. 381-399, (2003).
Copending U.S. Appl. No. 14/299,945, filed Jun. 9, 2014, Jun Lu, et al. (Now Publication No. 2014-0363651).

(56) References Cited

OTHER PUBLICATIONS

Copending U.S. Appl. No. 14/300,612, filed Jun. 10, 2014, Jun Lu (Now Publication No. 2014-0364550).
Copending U.S. Appl. No. 14/299,975, filed Jun. 9, 2014, Jun Lu, et al. (Now Publication No. 2014-0363652).
Copending U.S. Appl. No. 14/299,996, filed Jun. 9, 2014, Jun Lu, et al. (Now Publication No. 2014-0364549).
PCT International Search Report and Written Opinion dated Aug. 29, 2014 for International Application No. PCT/US2014/041698.
Copending U.S. Appl. No. 14/505,191, filed Oct. 2, 2014, Jun Lu.
Copending U.S. Appl. No. 14/505,247, filed Oct. 2, 2014, Jun Lu.
Copending U.S. Appl. No. 14/514,641, filed Oct. 15, 2014, Jun Lu.
Copending U.S. Appl. No. 14/563,352, filed Dec. 8, 2014, Zhou Li, et al.
Copending U.S. Appl. No. 14/563,359, filed Dec. 8, 2014, Jun Lu, et al.
Copending U.S. Appl. No. 14/563,364, filed Dec. 8, 2014, Jun Lu, et al.
Copending U.S. Appl. No. 14/563,372, filed Dec. 8, 2014, Jun Lu, et al.
Copending U.S. Appl. No. 14/563,373, filed Dec. 8, 2014, Jun Lu, et al.
Copending U.S. Appl. No. 14/563,378, filed Dec. 8, 2014, Jun Lu, et al.
Copending U.S. Appl. No. 14/563,719, filed Dec. 8, 2014, Jun Lu, et al.
Copending U.S. Appl. No. 14/563,011, filed Dec. 8, 2014, Jun Lu.
Copending U.S. Appl. No. 14/563,381, filed Dec. 8, 2014, Jun Lu, et al.
PCT International Search Report and Written Opinion dated Jan. 22, 2015 for International Application No. PCT/US2014/041689.
Office Action dated Apr. 6, 2015 received in co-pending U.S. Appl. No. 14/300,612.
Office Action dated Apr. 15, 2015 received in co-pending U.S. Appl. No. 14/299,996.
Hallensleben, Manfred L. et al.; "Polyvinyl Compounds, Others"; Ullmann's Encyclopedia of Industrial Chemistry; Jul. 2015; pp. 1-23.
Naje, Asama Natik, et al.; "Effect of Indium Tin Oxide (ITO) Nanoparticles on the Optical Properties of PMMA Polymer"; Journal of University of Kerbala, The International 3$^{rd}$ Scientific Conference of the College of Science; 2015; pp. 17-23.
"Chemical Information Profile for Indium Tin Oxide"; National Toxicology Program; Jun. 2009; pp. 1-28.
Althues, H. et al.; "Functional inorganic nanofillers for transparent polymers"; Chemical Society Reviews; Mar. 2007; pp. 1454-1465.
Wypych, George; "Sources of Fillers, Their Chemical Composition, Properties, and Morphology"; Handbook of Fillers, 2$^{nd}$ Edition; 2000; pp. 19-177.
Reis, Joao Carlos R. et al.; "Refractive Index of Liquid Mixtures: Theory and Experiment"; ChemPhysChem; 2010; pp. 3722-3733.
"Uniplex 988 and Uniplex 988S" Technical Information: Lanxess Deutschland GmbH; 2012; pp. 2.
"Butvar polyvinyl butyral resin—Properties and uses" Technical Information; 2013; pp. 1-29.
Copending U.S. Appl. No. 15/474,105, filed Mar. 30, 2017, Jun Lu.
Copending U.S. Appl. No. 15/438,243, filed Feb. 21, 2017, Lu et al.
Co-pending U.S. Appl. No. 15/428,557, filed Feb 9, 2017, Jun Lu and Yalda Farhoudi.
Co-pending U.S. Appl. No. 15/376,849, filed Dec. 13, 2016; Lu and Li; now U.S. Patent Publication No. 2017-0087813.
Co-pending U.S. Appl. No. 15/427,798, filed Feb. 8, 2017.
Co-pending U. S. Appl. No. 15/427,844, filed Feb. 8, 2017; Lu and Li.
Office Action dated Mar. 9, 2017 received in co-pending U.S. Appl. No. 14/882,317.
Office Action dated Nov. 21, 2016 received in co-pending U.S. Appl. No. 14/505,191.
Office Action dated May 8, 2017 received in co-pending U.S. Appl. No. 14/505,191.
Office Action dated Nov. 25, 2016 received in co-pending U.S. Appl. No. 14/505,247.
Office Action dated Oct. 6, 2016 received in co-pending U.S. Appl. No. 14/563,378.
Office Action dated Apr. 27, 2017 received in co-pending U.S. Appl. No. 14/563,378.
Office Action dated Mar. 9, 2017 received in co-pending U.S. Appl. No. 14/563,719.
Office Action dated Apr. 28, 2017 received in co-pending U.S. Appl. No. 14/563,381.
Notification of Transmittal of the International Search Report and the Written Opinion of the International Searching Authority, or the Declaration dated May 9, 2017 received in International Application No. PCT/US2017/016898.
Office Action dated Feb. 1, 2017 received in co-pending U.S. Appl. No. 14/587,702.
Office Action dated May 23, 2017 received in co-pending U.S. Appl. No. 14/563,011.
parchem.com, cinnamaldehyde, 2017, obtain from www.parchem.com/cinnamaldehyde-getpdf-011158.aspx.
parchem.com, Dipropylene Glycol Dibenzoate, 2017, obtained from http://www.parchem.com/chemical-supplier-distributor/Dipropylene-Glycol-Dibenzoate-012292.aspx.

* cited by examiner

MULTIPLE LAYER INTERLAYER HAVING IMPROVED OPTICAL AND SOUND INSULATION PROPERTIES

BACKGROUND OF THE INVENTION

Field of the Invention

This disclosure is related to the field of polymer interlayers for multiple layer glass panels and multiple layer glass panels having at least one polymer interlayer sheet. Specifically, this disclosure is related to the field of polymer interlayers comprising multiple thermoplastic layers which have improved optical and acoustic properties and resist formation of certain optical defects.

Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications and in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may also give the glass a much higher sound insulation rating, reduce UV and/or IR light transmission, and enhance the aesthetic appeal of the associated window. In regard to the photovoltaic applications, the main function of the interlayer is to encapsulate the photovoltaic solar panels which are used to generate and supply electricity in commercial and residential applications.

In order to achieve the certain property and performance characteristics for the glass panel, it has become common practice to utilize multiple layer or multilayered interlayers. As used herein, the terms "multilayer" and "multiple layers" mean an interlayer having more than one layer, and multilayer and multiple layer may be used interchangeably. Multiple layer interlayers typically contain at least one soft layer and at least one stiff layer. Interlayers with one soft "core" layer sandwiched between two more rigid or stiff "skin" layers have been designed with sound insulation properties for the glass panel. Interlayers having the reverse configuration, that is, with one stiff layer sandwiched between two more soft layers have been found to improve the impact performance of the glass panel and can also be designed for sound insulation. Examples of multiple layer interlayers also include the interlayers with at least one "clear" or non-colored layer and at least one colored layer or at least one conventional layer, e.g., non-acoustic layer, and at least one acoustic layer (i.e., a layer have acoustic properties or the ability to provide sound insulation or reduce sound transmission, as further defined below). Other examples of multiple layer interlayers include interlayers with at least two layers with different colors for aesthetic appeal. The colored layer typically contains pigments or dyes or some combination of pigments and dyes.

The layers of the interlayer are generally produced by mixing a polymer resin such as poly(vinyl butyral) with one or more plasticizers and melt processing the mix into a sheet by any applicable process or method known to one of skill in the art, including, but not limited to, extrusion. Multiple layer interlayers can be produced by processes such as co-extrusion or lamination wherein the layers are combined together to form a unitary structure. Other additional ingredients may optionally be added for various other purposes. After the interlayer sheet is formed, it is typically collected and rolled for transportation and storage and for later use in the multiple layer glass panel, as discussed below.

The following offers a simplified description of the manner in which multiple layer glass panels are generally produced in combination with the interlayers. First, at least one polymer interlayer sheet (single or multilayer) is placed between two substrates and any excess interlayer is trimmed from the edges, creating an assembly. It is not uncommon for multiple polymer interlayer sheets or a polymer interlayer sheet with multiple layers (or a combination of both) to be placed within the two substrates creating a multiple layer glass panel with multiple polymer interlayers. Then, air is removed from the assembly by an applicable process or method known to one of skill in the art; e.g., through nip rollers, vacuum bag or another deairing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process, or any other method known to one of ordinary skill in the art such as, but not limited to, autoclaving.

Multilayer interlayers such as a trilayer interlayer having a soft core layer and two stiffer skin layers are commercially available. The stiff skin layers provide handling, processing and mechanical strength of the interlayer; the soft core layer provides acoustic damping properties. One of the problems in the manufacture of multilayer laminate glass panels having multiple layer interlayers is the presence of mottle in the final unitary structure. The term "mottle" refers to an objectionable visual defect in the final unitary structure, namely the appearance of uneven spots, a form of optical distortion. Stated differently, mottle is a measure of the graininess or texture formed from the optical effect of reflecting non-uniform distorted interfaces of the inner polymer interlayer or polymer interlayers.

In multiple layer interlayers having at least one soft layer and at least one stiff layer, the mottle is caused by small scale surface variations at the interfaces between the layers wherein the individual layers (or the soft and stiff layers) have different refractive indices. When the polymer interlayer is produced, surface roughness is formed at the utmost surface of the polymer interlayer through melt fracture or embossing or both. The surface roughness enables and improves removal of air during laminating of polymer interlayers to produce multiple layer glass panels, and helps to prevent the blocking of the polymer interlayers during storage. However, such surface roughness will also cause the development of small scale surface variations at the interfaces between layers of the multilayer interlayer to form mottle.

The refractive index of a substance, such as an interlayer, is the measure of the speed of light through the substance with respect to the speed of light in vacuum. If there is a difference between the refractive index of the layers, the result will be that the surface variations at the interface are visible or even more visible due to diffraction of the light at the layer interfaces. Mottle is theoretically possible with any multiple layer interlayer, especially where there is a sufficiently large difference in the refractive indices between the layers and there is some degree of interfacial variation between the layers.

The presence of mottle in the final unitary structure of a multilayer laminate glass panel can be problematic because a certain degree of optical quality is necessary in many (if not most) of the end-use commercial applications of multilayer laminate glass panels (e.g., vehicular, aeronautical and architectural applications). Thus, the creation of multilayer laminate glass panels with commercially acceptable levels of mottle (that is, where the level of mottle is low) is paramount in the art of multiple layer glass panel manufacturing.

To ascertain the level of mottle in a laminate, the severity of the mottle is assessed and categorized by a side-to-side qualitative comparison of the shadowgraph projections for a test laminate with a set of standard laminate shadowgraphs representing a series or scale of mottle values ranging from 1 to 4, with 1 representing a standard of low mottle (i.e., a low number of disruptions) and 4 representing a standard of high mottle (i.e., a high number of disruptions), which is optically objectionable. Based upon a visual interpretation of which standard laminate shadowgraph picture the test shadowgraph projection best corresponds with, the test laminate is then placed into the mottle category of the corresponding standard laminate. Shadowgraph pictures can also be captured by a digital camera and analyzed by digital image analysis tools to give digitalized results or mottle ratings. Digitalized rating is calibrated using the same set of standard laminates representing a series of mottle values ranging from 1 to 4. A xenon arc lamp is used as the light source for shadowgraph projections.

Clarity of the multiple layer panel is another important optical quality. Clarity is determined by measuring the level of haze in the multiple layer panel, as further described below. The level of haze must be very low so that the multiple layer panel is clear. In addition to haze, there are other optical quality defects, such as visible optical defects in the interlayer, that cause light scattering and make the defect visible to the eye that may cause optical distortion in the glass panel as well. Both haze and other visible optical defects are caused by light scattering due to the blending or mixing of materials, such as different polymers or plasticizers, together, or the contamination from such different polymers or plasticizers where there is a sufficiently large difference in the refractive index between the different polymers or plasticizers, the matrix and the contaminants, or both.

Summarized, optical quality defects such as mottle, haze and other visible optical defects are common problems in the field of multiple layer glass panels, particularly those used in applications which require higher levels of optical or visual quality. It is now common to use a multilayer interlayer in order to provide high performance laminates. The use of multilayer interlayers, however, has very often resulted in having optical defect problems, such as mottle. Accordingly, there is a need in the art for the development of a multilayered interlayer that has good optical, mechanical, and acoustic characteristics desirable in a multilayered interlayer. More specifically, there is a need in the art for the development of multilayered interlayers having at least one soft core layer that has good acoustic properties and resists formation of optical defects.

SUMMARY OF THE INVENTION

Because of these and other problems in the art, described herein, among other things are multilayered interlayers comprising stiff skin layers and a soft core layer(s). In an embodiment, these multilayered interlayers comprise: a first polymer layer (core layer) comprising a blend of two or more plasticized poly(vinyl acetal) resins having different residual hydroxyl content and wherein the plasticizer is a high refractive index plasticizer having a refractive index of at least about 1.460; a second polymer layer (skin layer) comprising plasticized poly(vinyl acetal) resin; and optionally, a third polymer layer (skin layer) comprising plasticized poly(vinyl acetal) resin. The first polymer layer is disposed adjacent the second polymer layer. If there are three or more layers, the first polymer layer (and any subsequent layers, such as the fourth, fifth, sixth or more) is disposed between the second polymer layer and the third polymer layer, resulting in two skin layers and a central core layer(s).

In an embodiment, a polymer interlayer comprises: at least one soft layer having a first refractive index, the soft layer comprising a first poly(vinyl acetal) resin having a first residual hydroxyl content and a first residual acetate content, and a first plasticizer; at least one stiffer layer having a second refractive index, the stiffer layer comprising a second poly(vinyl acetal) resin having a second residual hydroxyl content and a second residual acetate content, and a second plasticizer; wherein at least one of the first and second plasticizers is a high refractive index plasticizer having a refractive index of at least about 1.460; wherein the absolute value of the difference between the first refractive index and the second refractive index (delta RI) is less than about 0.010; wherein the difference between the first residual hydroxyl content and the second residual hydroxyl content is at least 2.0 weight percent; and wherein the polymer interlayer has a damping loss factor (q) (as measured by ISO 16940) of at least about 0.15 at 20° C. and a sound transmission loss (STL) (as measured by ASTM E90 (2009) at 20° C.) of at least 37 decibels.

In embodiments, the difference between the first residual acetate content and the second residual acetate content is less than 2.0 weight percent, or less than 1.5 weight percent, or less than 1.0 weight percent, or less than 0.5 weight percent.

In embodiments, the difference between the first residual acetate content and the second residual acetate content is at least 2.0 weight percent, or at least 3.0 weight percent, or at least 4.0 weight percent, or at least 5.0 weight percent, or at least 6.0 weight percent, or at least 7.0 weight percent, or at least 8.0 weight percent, or at least about 9.0 weight percent, or at least about 10 weight percent, or at least about 12 weight percent, or at least about 14 weight percent, or at least about 16 weight percent, or at least about 18 weight percent, or at least 20 weight percent, or at least about 24 weight percent, or at least 29 weight percent. In embodiments, at least one of the first poly(vinyl acetal) resin and the second poly(vinyl acetal) resin has a residual acetate content of at least about 4 weight percent, or at least about 5 weight percent, or at least about 6 weight percent, or at least about 7 weight percent, or at least about 8 weight percent, or at least about 10 weight percent, or at least about 12 weight percent, or at least about 14 weight percent, or at least about 16 weight percent, or at least about 18 weight percent, or at least about 20 weight percent, or at least about 25 weight percent, or at least about 30 weight percent.

In embodiments, the difference between the first residual hydroxyl content and the second residual content is at least 3.0 weight percent, or at least 4.0 weight percent, or at least 5.0 weight percent, or at least 6.0 weight percent, or at least 7.0 weight percent, or at least 8.0 weight percent, or at least about 9.0 weight percent, or at least about 10 weight percent, or at least about 12 weight percent, or at least about 15 weight percent, or at least about 18 weight percent, or at least about 21 weight percent, or at least about 24 weight percent, or at least 28 weight percent.

In embodiments, the polymer interlayer has a sound transmission loss (STL) (as measured by ASTM E90 (2009) at 20° C.) of at least 38 decibels, or at least 39 decibels, or at least 40 decibels.

In embodiments, the soft layer of the polymer interlayer has a glass transition temperature ($T_g$) less than 20° C., or less than 15° C., or less than 10° C., or less than 5° C., or less than 0° C., or less than −5° C., or less than −10° C.

In embodiments, the high refractive index plasticizer is selected from adipates, epoxides, phthalates, terephthalates, iso-phthalates, benzoates, substituted phenols, and other specialty plasticizers and mixtures thereof. In embodiments, the high refractive index plasticizer comprises an unsaturated aromatic moiety. In embodiments, the first plasticizer comprises a high refractive index plasticizer having a refractive index of at least 1.460. In embodiments, the first plasticizer or the second plasticizer further comprises a plasticizer having a refractive index of less than about 1.450. In embodiments, the second plasticizer has a refractive index of less than about 1.450. In embodiments, the interlayer further comprises a second high refractive index plasticizer having a refractive index of at least 1.460.

In embodiments, the polymer interlayer further comprises a third poly(vinyl acetal) resin having a third residual hydroxyl content and a third residual acetate content, and wherein the difference between the first residual acetate content and the third residual acetate content is at least 2.0 weight percent or the difference between the first residual hydroxyl content and the third residual hydroxyl content is at least 2.0 weight percent, or the difference between the first residual acetate content and the third residual acetate content is at least 2.0 weight percent and the difference between the first residual hydroxyl content and the third residual hydroxyl content is at least 2.0 weight percent.

In embodiments, the polymer interlayer has at least two different glass transition temperatures ($T_g$) and the difference between two different glass transition temperatures ($T_g$) is at least 3° C., or at least 4° C., or at least 5° C., or at least 6° C., or at least 7° C., or at least 8° C., or at least 9° C., or at least 10° C., or at least 15° C., or at least 20° C., or at least 25° C., or at least 30° C., or at least 35° C., or at least 40° C.

In embodiments, the polymer interlayer has a mottle of less than 3, or less than 2, or less than 1.

In embodiments, the polymer interlayer further comprises a second stiffer layer.

In an embodiment, a polymer interlayer comprises: at least one soft layer having a first refractive index, the soft layer comprising a first poly(vinyl acetal) resin having a first residual hydroxyl content and a first residual acetate content, and a first plasticizer; at least one stiffer layer having a second refractive index, the stiffer layer comprising a second poly(vinyl acetal) resin having a second residual hydroxyl content and a second residual acetate content, and a second plasticizer; wherein at least one of the first and second plasticizers is a high refractive index plasticizer having a refractive index of at least about 1.460; wherein the absolute value of the difference between the first refractive index and the second refractive index (delta RI) is less than about 0.010; wherein the difference between the first residual acetate content and the second residual acetate content is at least 2.0 weight percent; and wherein the polymer interlayer has a damping loss factor (q) (as measured by ISO 16940) of at least about 0.15 at 20° C. and a sound transmission loss (STL) (as measured by ASTM E90 (2009) at 20° C.) of at least 37 decibels.

In an embodiment, a polymer interlayer comprises: at least one soft layer having a first refractive index, the soft layer comprising a first poly(vinyl acetal) resin having a first residual hydroxyl content and a first residual acetate content, and a first plasticizer; at least one stiffer layer having a second refractive index, the stiffer layer comprising a second poly(vinyl acetal) resin having a second residual hydroxyl content and a second residual acetate content, and a second plasticizer; wherein at least one of the first and second plasticizers is a high refractive index plasticizer having a refractive index of at least about 1.460; wherein the absolute value of the difference between the first refractive index and the second refractive index (delta RI) is less than about 0.010; wherein the difference between the first residual hydroxyl content and the second residual hydroxyl content is at least 2.0 weight percent; wherein the difference between the first residual acetate content and the second residual acetate content is at least 2.0 weight percent; and wherein the polymer interlayer has a damping loss factor (q) (as measured by ISO 16940) of at least about 0.15 at 20° C. and a sound transmission loss (STL) (as measured by ASTM E90 (2009) at 20° C.) of at least 37 decibels.

In embodiments, the polymer interlayer has at least two different glass transition temperatures ($T_g$) and the difference between at least two different glass transition temperatures ($T_g$) is at least 4° C., at least 5° C., at least 6° C., at least 7° C., at least 8° C., or at least 9° C., or at least 10° C., at least 15° C., at least 15° C., at least 20° C., at least 25° C., at least 30° C., at least 35° C., or at least 40° C.

A multiple layer panel is also disclosed. The multiple layer panel comprises at least one rigid substrate, and a polymer interlayer as disclosed herein. The panel has good acoustic and optical properties.

A method of making a polymer interlayer is also disclosed, wherein the polymer interlayer comprises is as disclosed herein.

In certain embodiments, the rigid substrate (or substrates) is glass.

DESCRIPTION OF THE PREFERRED EMBODIMENT(S)

Described herein, among other things, are multilayer interlayers comprised of at least one soft core layer comprising a resin and a plasticizer, at least one stiff skin layer comprising a resin and a plasticizer, wherein at least one plasticizer is a high refractive index plasticizer, such as a high refractive index plasticizer having an unsaturated aromatic group, wherein the residual hydroxyl content (measured as % PVOH by weight) and/or residual acetate content (measured as % vinyl acetate by weight) of one resin is higher than that of the other (or another) resin (or stated differently, where the two resins have different residual hydroxyl contents and/or residual acetate contents). The interlayers of present disclosure have improved (lower) mottle (or resist formation of mottle), such as mottle of less than 3, or less than 2, or less than 1, and have good acoustic or sound insulation properties as measured by sound transmission loss ("STL"). The interlayers of the present invention have a sound transmission loss (STL) (as measured by ASTM E90 (2009) at 20° C.) of at least about 37 decibels and damping loss factor (as measured by ISO16940 at 20° C.) of at least 0.15.

Also described are multiple layer glass panels comprising the interlayers. The multilayered interlayers also have excellent clarity (or very low haze). The multilayer interlayers of the present invention can be used in multiple layer glass applications, such as safety glass in windshields, side windows, sun roofs, and roof and architectural windows.

The present invention discloses polymer interlayer compositions for use in one or more layers of a multilayered interlayer wherein at least one layer comprises a high refractive index plasticizer, such as a high refractive index plasticizer having an unsaturated aromatic moiety or group and a refractive index (RI) greater than that of commonly used 3GEH plasticizer (triethylene glycol di-(2-ethylhexanoate)). These interlayers offer good acoustic or sound insulation performance while reducing or eliminating optical defects such as mottle defects.

Each layer of the multilayered polymer interlayer can be made by mixing one or more polymer resins such as poly(vinyl acetal) resin (such as PVB) and one or more plasticizers. The multilayer interlayer generally contains two or more layers and two or more resins of different compositions. For example, poly(vinyl acetal) resins, such as PVB resins, of different residual hydroxyl contents and/or residual acetate contents are suitable for the layers of the multilayered interlayer compositions. In multilayer comprising two layers, at least one of the two layers is a soft layer and the other layer is a stiff layer. As used herein, a "soft layer" or "softer layer" is the layer having a glass transition temperature less than about 20° C. As used herein, a "stiff layer" or "stiffer layer" generally refers to a layer that is stiffer or more rigid than another layer and that has a glass transition temperature that is generally at least two degrees C. (2° C.) higher than another layer (such as the softer layer).

The multilayer interlayers formed from the compositions contain two or more glass transitions, and the lowest glass transition occurs at less than 20° C., or less than 15° C., or less than 10° C., or less than 5° C., or less than 0° C., or less than −5° C., or less than −10° C. In embodiments, the multilayer interlayers have at least one layer that has at least one plasticizer that contains unsaturated aromatic moiety or group or at least one plasticizer having a refractive index greater than about 1.460. The refractive index of each layer in the multilayered interlayer is greater than 1.475, greater than 1.480, greater than 1.485, or greater than 1.490, and the refractive index of any one layer differs by no more than 0.010 from any adjacent layers.

The interlayer, or at least one layer of the interlayer, comprises at least one high refractive index plasticizer having a refractive index greater than about 1.460. In embodiments, the plasticizer is selected from high refractive index plasticizers having an unsaturated aromatic moiety or group, such as phthalates, terephthalates, iso-phthalates, benzoates, substituted phenols, and other specialty plasticizers and mixtures thereof.

Multilayer interlayers comprising such plasticizers are in particular useful for laminated glass panels and impart certain properties and performance attributes not found in conventional sound reducing poly(vinyl acetal) interlayers. For example, conventional acoustic interlayers comprise a conventional plasticizer (having a lower refractive index) and have certain optical defects such as mottle when used in glass panels (such as windshields) that are undesirable and objectionable. The layers, and the multilayer interlayers, of the present invention provide interlayers having good acoustic properties such as sound insulation properties, comparable to those of the conventional interlayer using a conventional plasticizer while significantly reducing or eliminating optical defects such as mottle.

Conventional multilayer interlayers such as a trilayer acoustic interlayer contain a soft core layer consisting of a single poly(vinyl butyral) ("PVB") resin having a low residual hydroxyl content and a high amount of a conventional plasticizer, and two stiff skin layers having significantly higher residual hydroxyl content (see, for example U.S. Pat. Nos. 5,340,654, 5,190,826, and 7,510,771). The residual hydroxyl content in the PVB core resin and the amount of the plasticizer are optimized such that the interlayer provides optimal sound insulation properties under ambient conditions for multiple layer glass panels such as windshields and windows installed in vehicles and buildings.

Multilayer acoustic interlayers such as a trilayer can now be designed and produced by: (1) selecting a plasticizer or a mixture of plasticizers where at least one of the plasticizers is a high refractive index plasticizer, such as a high refractive index plasticizer having an unsaturated aromatic moiety or group, (2) minimizing the refractive index difference (delta RI) between the skin layer(s) and the core layer(s), (3) maintaining plasticizer equilibrium between the core layer(s) and the skin layer(s) and (4) combining the core layer(s) and skin layer(s) to form multilayer interlayers by applicable processes such as co-extrusion or lamination. The resultant multilayer acoustic interlayer reduces or eliminates mottle formation and provides excellent clarity and sound insulation properties without sacrificing other favorable and desired characteristics of conventional multilayered interlayers, for example, optical properties, and mechanical strength of the glass panels made with the multilayered acoustic interlayer.

Prior to discussing the plasticizer or mixture of plasticizers that are used in at least one layer of a multilayer interlayer to produce the interlayer having improved (lower) mottle and improved sound insulation properties, some terminology as well as common components found in an interlayer, both generally and in interlayers of the present disclosure, and the formation thereof, will be discussed. The terms "polymer interlayer sheet," "interlayer," and "polymer melt sheet" as used herein, generally may designate a single-layer sheet or a multilayered interlayer. A "single-layer sheet," as the name implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; a combination of a single-layer sheet and a plural-layer sheet; and a combination of at least one plural-layer sheet and at least one co-extruded sheet. In various embodiments of the present disclosure, a multilayered interlayer comprises at least two polymer layers (e.g., a single layer or multiple layers co-extruded and/or laminated together) disposed in direct contact with each other, wherein each layer comprises a polymer resin, as detailed more fully below. As used herein for multilayer interlayers having at least three layers, "skin layer" generally refers to the outer layers of the interlayer and "core layer" generally refers to the inner layer(s). Thus, one exemplary embodiment would be: skin layer//core layer//skin layer. In the multilayer interlayers having skin layer//core layer//skin layer configuration, in some embodiments the skin layer maybe stiffer and the core layer may be softer, while in other embodiments the skin layer may be softer and the core layer may be stiffer.

As used herein, "Sound Transmission Loss" is determined for a laminate containing the interlayer of the present invention or comparative interlayer in accordance with ASTM E90 (2009) method at a fixed temperature of 20° C. A "Reference Panel" of 2.3 mm clear glass//"Reference interlayer"//2.3 mm clear glass is measured to have STL of 31 decibels ("dB") at the coincident frequency (3,150 Hz), wherein the "Reference Interlayer" is produced by mixing and melt-extruding 100 parts poly(vinyl butyral) resin having a residual hydroxyl content of about 19 wt. % and a vinyl acetate residue of about 2 wt. %, 38 parts by weight of 3GEH plasticizer, and other common additives (as described above). The Reference Interlayer has a thickness of 0.76 mm and a glass transition temperature of 30° C. The multilayer interlayers of the present invention or the comparative multilayer interlayers are also laminated with 2.3 mm clear glass according to the method described above for making the reference (or test) laminated glass panel (having a configuration of 2.3 mm glass//interlayer//2.3 mm glass). The panel has dimensions of 50 cm by 80 cm. The STL of the test panel at the coincident frequency (reference frequency) of the "Reference Panel" (e.g., STL at 3,150 Hz) is used to assess the sound insulation property of the panel.

As used herein, "sound transmission loss (STL) (as measured by ASTM E90 (2009) at 20° C.)" of the interlayer or "sound transmission loss (STL) of the interlayer" refers to the STL at the reference frequency described above. In various embodiments, the interlayers of the present invention have sound transmission loss (STL) at least about 37 decibels, at least about 38 decibels, at least about 39 decibels, or at least 40 decibels.

The poly(vinyl acetal) resin is produced by known acetalization processes by reacting polyvinyl alcohol ("PVOH") with one or more aldehydes such as butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc., a wholly owned subsidiary of Eastman Chemical Company.

As used herein, residual hydroxyl content (calculated as % vinyl alcohol or % PVOH by weight) in poly(vinyl acetal) resin refers to the amount of hydroxyl groups remaining on the polymer chains after processing is complete. For example, PVB can be manufactured by hydrolyzing poly(vinyl acetate) to poly(vinyl alcohol) (PVOH), and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl hydroxyl groups) as side groups on the polymer chain. As used herein, residual acetate content (calculated as % vinyl acetate content or poly(vinyl acetate) (PVAc) by weight in poly(vinyl acetal) refers to the amount of residual groups remaining on the polymer chains.

As used herein, residual hydroxyl content and residual acetate content is measured on a weight percent (wt. %) basis per ASTM D1396.

According to the present invention, multilayer interlayers comprise at least a first layer comprising a first poly(vinyl acetal) resin and a second layer comprising a second poly(vinyl acetal) resin. In various embodiments, the first layer can be the soft layer and the second layer can be the stiff layer. In various embodiments, the refractive index of the two layers differs by no more than 0.010, no more than 0.009, no more than 0.008, no more than 0.006, no more than 0.005, no more than 0.004, no more than 0.003, no more than 0.002, or no more than 0.001. In embodiments, when multilayer interlayer of the present invention is a trilayer, the core layer is the soft layer and the skin layers are the stiff layers. In other embodiments, the core layer is stiff and the skin layers are soft.

In various embodiments, where the interlayer is a multilayer interlayer such as a trilayer, the soft (or core) layer comprises the first poly(vinyl acetal) resin (or the first resin) comprising about 7 to about 16 weight percent (wt. %) hydroxyl groups calculated as % PVOH, about 7 to about 14 wt. %, about 9 to about 14 wt. %, and for certain embodiment, about 11 to about 13 wt. % hydroxyl groups calculated as % PVOH. The resin can also comprise less than 30 wt. % residual acetate groups, less than 25 wt. % residual acetate groups, less than 20 wt. %, less than 15 wt. %, less than 13 wt. %, less than 10 wt. %, less than 7 wt. %, less than 5 wt. %, or less than 1 wt. %, or less than 0.5 wt. % residual acetate groups calculated as poly(vinyl acetate), or in the range of from 0 to 30 wt. %, 1 to 30 wt. %, 2 to 25 wt. %, 5 to 20 wt. %, or 7 to 15 wt. % residual acetate groups, with the balance being an acetal, such as butyraldehyde (which includes isobutyraldehyde acetal groups), but optionally another acetal group, such as a 2-ethyl hexanal acetal group, or a mix of butyraldehyde acetal and 2-ethyl hexanal acetal groups.

In various embodiments, where the interlayer is a multilayer interlayer such as a trilayer, the stiff (or skin) layer(s) comprises the second poly(vinyl acetal) resin or (the second resin) having a residual hydroxyl of at least 2 wt. %, or at least 4 wt. %, or at least 6 wt. %, or at least 8 wt. %, or at least by 10 wt. %, or at least by 12 wt. %, or at least by 15 wt. %, or at least by 18 wt. %, or at least by 21 wt. %, or at least by 24 wt. %, or at least by 28 wt. % greater than the residual hydroxyl content of the resin in the soft (or core) layer, and the resin in the skin layer can comprise about 15 to about 35 wt. %, about 15 to about 30 wt. %, or about 17 to about 22 wt. %; and, for certain embodiments, about 17.25 to about 22.25 wt. % residual hydroxyl groups calculated as % PVOH.

This difference between the first poly(vinyl acetal) resin and the second poly(vinyl acetal) resin is calculated by subtracting the residual hydroxyl content of the resin with the lower residual hydroxyl content from the residual hydroxyl content of the resin with the greater residual hydroxyl content. As used herein, the term "weight percent different" or "the difference . . . is at least . . . weight percent" refers to a difference between two given weight percentages, calculated by subtracting the one number from the other. For example, a poly(vinyl acetal) resin having a residual hydroxyl content of 12 weight percent has a residual hydroxyl content that is 2 weight percent lower than a poly(vinyl acetal) resin having a residual hydroxyl content of 14 weight percent (14 weight percent−12 weight percent=2 weight percent). As used herein, the term "different" can refer to a value that is higher than or lower than another value. One or more other poly(vinyl acetal) layers may also be present in the interlayer and can have a residual hydroxyl within the ranges provided above. Additionally, the residual hydroxyl content of the one or more other poly(vinyl acetal) resins can be the same as or different than the residual hydroxyl content of the first and/or second poly(vinyl acetal) resins.

In various embodiments, the first poly(vinyl acetal) resin for the soft layer or the second poly(vinyl acetal) resin for the stiff layer(s) can also comprise less than 30 wt. % residual acetate groups, less than 25 wt. % residual acetate groups, less than 20 wt. %, less than 15 wt. %, less than 13 wt. %, less than 10 wt. %, less than 7 wt. %, less than 5 wt. %, or less than 1 wt. % residual acetate groups calculated as poly(vinyl acetate), with the balance being an acetal, such as butyraldehyde (which includes isobutyraldehyde acetal groups), but optionally another acetal group, such as a 2-ethyl hexanal acetal group, or a mix of butyraldehyde acetal and 2-ethyl hexanal acetal groups, as previously discussed.

In some embodiments, the first and second poly(vinyl acetal) resins can have different residual acetate contents. For example, in some embodiments, the difference between the residual acetate content of the first and second poly(vinyl acetal) resins can be at least about 2, at least about 3, at least about 4, at least about 5, at least about 6, at least about 7, at least about 8, at least about 9, at least about 10, at least about 12, at least about 14, at least about 16, at least about 18, at least about 20, at least about 24, or at least 29 weight percent. One of the poly(vinyl acetal) resins may have a residual acetate content of not more than about 4, not more than about 3, not more than about 2, or not more than about 1 weight percent, measured as described above. In some embodiments, one of the first and second poly(vinyl acetal) resins can have a residual acetate content of at least 4, at least about 5, at least about 6, at least about 7, about 8, at least about 10, at least about 12, at least about 14, at least about 16, at least about 18, at least about 20, at least about 25, or at least about 30 weight percent. In other embodiments, the first and second poly(vinyl acetate) resins both can have a residual acetate content of at least 4, at least about 5, at least about 6, at least about 7, about 8, at least about 10, at least about 12, at least about 14, at least about 16, at least about 18, at least about 20 weight percent. The difference in the residual acetate content between the first and second poly(vinyl acetal) resins can be within the ranges provided above, or the difference can be less than about 3, not more than about 2, not more than about 1, or not more than about 0.5 weight percent. Additional poly(vinyl acetal) layers present in the interlayer can have a residual acetate content the same as or different from the residual acetate content of the first and/or second poly(vinyl acetal) resin.

The poly(vinyl acetal) resin such as poly(vinyl butyral) (PVB) resin (or resins) of the present disclosure typically has a molecular weight of greater than 50,000 Daltons, or less than 500,000 Daltons, or about 50,000 to about 500,000 Daltons, or about 70,000 to about 500,000 Daltons, or about 100,000 to about 425,000 Daltons, as measured by size exclusion chromatography using a low angle laser light scattering detector, a differential refractometer or a UV detector. As used herein, the term "molecular weight" means the weight average molecular weight.

Various adhesion control agents ("ACAs") can be used in the interlayers of the present disclosure to control the adhesion of the interlayer sheet to glass. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), sodium acetate, potassium acetate, magnesium bis(2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

The plasticizers or mixture of plasticizers in the layers are selected such that the difference in refractive indices of the layers is minimized, which results in multilayer acoustic interlayer that exhibit decreased levels of mottle, or stated differently, have excellent mottle performance while maintaining good acoustic performance. In various embodiments, the plasticizer is selected from high refractive index plasticizers such as plasticizers having an unsaturated aromatic moiety or group, a mixture of two or more high refractive index plasticizers where at least one of the high refractive index plasticizers may have an unsaturated aromatic moiety or group, or a mixture of a conventional plasticizer and one or more high refractive index plasticizer(s) where at least one of the high refractive index plasticizers may have an unsaturated aromatic moiety or group. In various embodiments, the high refractive index plasticizer(s) is selected to eliminate potential high haze arising from blending two or more resins of different residual hydroxyl content.

Haze may be measured using a haze meter or a spectrophotometer, such as HunterLab UltraScan XE instrument, or other haze meter known to one of skill in the art, and in accordance with ASTM D1003-Procedure B using Illuminant C, at an observer angle of 2 degrees. Percent transmittance (% T) or Transparency, is the percentage of the total incident light transmitted through the specimen, and is determined according to ASTM D1003 as well. In various embodiments of the present disclosure, haze is less than 5%, less than 4%, less than 3%, less than 2%, less than 1%, and less than 0.5%.

As used herein, plasticizer having a refractive index of about 1.450 or less is referred to as a "conventional plasticizer". Conventional plasticizers include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. These plasticizers have refractive indices of about 1.442 to about 1.449. In comparison, PVB resin has a refractive index of approximately 1.485 to 1.495. In interlayers manufactured for various properties and applications, 3GEH (refractive index=1.442) is one of the most common plasticizers present.

In various embodiments, the high refractive index plasticizer(s) is selected such that the refractive index of the plasticizer is at least about 1.460, or greater than about 1.460, or greater than about 1.470, or greater than about 1.480, or greater than about 1.490, or greater than about 1.500, or greater than 1.510, or greater than 1.520, for both the core and/or skin layers. As used herein, a "high refractive index plasticizer" is a plasticizer having a refractive index of at least about 1.460. In some embodiments, the high refractive index plasticizer(s) is used in conjunction with a conventional plasticizer, and in some embodiments, if included, the conventional plasticizer is triethylene glycol di-(2-ethylhexanoate) ("3GEH"), and the refractive index of the plasticizer mixture is at least 1.460. As used herein, the refractive index of a plasticizer or a resin used in the entirety of this disclosure is either measured in accordance with ASTM D542 at a wavelength of 589 nm and 25° C. or as reported in literature in accordance with the ASTM D542.

Examples of plasticizers having a high refractive index that may be used include, but are not limited to, polyadipates (RI of about 1.460 to about 1.485); epoxides (RI of about 1.460 to about 1.480); phthalates and terephthalates (RI of about 1.480 to about 1.540); benzoates (RI of about 1.480 to about 1.550); and other specialty plasticizers (RI of about 1.490 to about 1.520). Specific examples of suitable high refractive index plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, bis-phenol A bis(2-ethylhexaonate), ethoxylated nonylphenol, nonylphenyl tetraethylene glycol, dioctyl phthalate, diisononyl phthalate, di-2-ethylhexyl terephthalate, mixtures of benzoic acid esters of dipropylene glycol and diethylene glycol, and mixtures thereof.

In any of these embodiments, the plasticizer(s) can be any of those described above. In some embodiments, the plasticizer(s) is selected such that the refractive index difference (delta RI) between the layers of the interlayer is minimized (that is, as close to 0.000 as possible), less than 0.010, or less than 0.009, or less than 0.008, or less than 0.007, or less than 0.006, or less than 0.005, or less than 0.004, or less than 0.003, or less than 0.002, or less than 0.001, or about 0.000. Delta RI is calculated by subtracting the refractive index of one layer (i.e., the core layer) from another layer (i.e., a skin layer). For example, if the core layer has a refractive index of 1.490 and a skin layer has a refractive index of 1.487, the delta RI is 1.490−1.487=0.003 (or if the core layer refractive index is subtracted from the skin layer refractive index, delta RI is the absolute value of 1.487−1.490=0.003).

The total plasticizer content in the interlayer can be from 0 to 120 phr, or greater than 0 phr, or greater than 5 phr, or greater than 10 phr, or greater than 15 phr, or greater than 20 phr, or greater than 25 phr, or greater than 30 phr and/or 120 phr or less, or 115 phr or less, or 110 phr or less, or 105 phr or less, or 100 phr or less, or 95 phr or less, or 90 phr or less, or 85 phr or less, or 80 phr or less, or 75 phr or less, or 70 phr or less, or within the range of 10 to 100 phr, or 20 to 80 phr, or 30 to 70 phr. In various embodiments of interlayers of the present disclosure, the interlayer comprises greater than 5 phr, about 5 to about 120 phr, about 10 to about 90 phr, about 20 to about 70 phr, about 30 to about 60 phr, or less than 120 phr, or less than 90 phr, or less than 60 phr, or less than 40 phr, or less than 30 phr total plasticizer. While the total plasticizer content is indicated above, the plasticizer content in the skin layer(s) or core layer(s) can be different from the total plasticizer content. In addition, the skin layer(s) and core layer(s) can have different plasticizer types and plasticizer contents, in the ranges previously discussed, as each respective layer's plasticizer content at the equilibrium state is determined by the layer's respective residual hydroxyl contents, as disclosed in U.S. Pat. No. 7,510,771 (the entire disclosure of which is incorporated herein by reference). For example, at equilibrium the interlayer could comprise two skin layers, each with 30 phr plasticizer, and a core layer with 65 phr plasticizer, for a total plasticizer amount for the interlayer of about 45.4 phr when the combined skin layer thickness equals that of the core layer. For thicker or thinner skin layers, the total plasticizer amount for the interlayer would change accordingly. As used herein, when the plasticizer content of the interlayer is given, the plasticizer content is determined with reference to the phr of the plasticizer in the mix or melt that was used to produce the interlayer.

The amount of plasticizer in the interlayer can be adjusted to affect the glass transition temperature ($T_g$) and the final acoustic performance of the interlayer. The glass transition temperature ($T_g$) is the temperature that marks the transition from the glassy state of the interlayer to the rubbery state. In general, higher amounts of plasticizer loading will result in lower $T_g$. Conventional, previously utilized interlayers generally have had a $T_g$ in the range of about −10 to 25° C. for acoustic (noise reducing) interlayers, and up to about 45° C. for hurricane and aircraft (stiffer or structural) interlayer applications.

An interlayer's glass transition temperature ($T_g$) is also correlated with the stiffness of the interlayer, and in general, the higher the glass transition temperature, the stiffer the interlayer. Generally, an interlayer with a glass transition temperature of 30° C. or higher increases windshield mechanical strength and torsional rigidity. A soft interlayer (generally characterized by an interlayer with a glass transition temperature of lower than 20° C.), on the other hand, contributes to the sound dampening effect (i.e., the acoustic characteristics). The interlayers of the present disclosure may have glass transition temperatures of about 26° C. or greater, or about 35° C. or greater for the stiffer layer(s), and about 20° C. or less, or 15° C. or less, or 10° C. or less, or about 5° C. or less, or 0° C. or less, or about −5° C. or less, or about −10° C. or less for the soft layer(s).

In some embodiments, the multilayered interlayers of the present disclosure combine these two advantageous properties (i.e., strength and acoustic) by utilizing harder or stiffer skin layers laminated with a softer core layer (e.g., stiff//soft//stiff) and softer skin layers laminated with a stiffer core layer (e.g., soft//stiff//soft), while also matching the refractive indices of the layers to reduce and/or minimize or eliminate mottle. In various embodiments, the multilayered interlayers generally comprise stiffer layer(s) comprising poly(vinyl acetal) resin(s) with a glass transition temperature of about 26° C. to about 60° C., about 26° C. to 40° C., about 26° C. or greater, about 30° C. or greater, and about 35° C. or greater, and softer layer(s) of about 20° C. or less, about 10° C. or less, or about 5° C. or less, or about 0° C. or less, or about −5° C. or less, or about −10° C. or less.

The final interlayer, whether formed from extrusion or co-extrusion or by lamination of multiple layers, generally has a random rough surface topography as it is formed through melt fractures of polymer melt as it exits the extrusion die and may additionally be embossed over the random rough surface on one or both sides (e.g., the skin layers) by any method of embossment known to one of ordinary skill in the art.

While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate of the present invention are formed using lamination processes known in the art.

Generally, the thickness, or gauge, of the polymer interlayer sheet will be in a range from about 15 mils to 100 mils (about 0.38 mm to about 2.54 mm), about 15 mils to 60 mils (about 0.38 mm to about 1.52 mm), about 20 mils to about 50 mils (about 0.51 to 1.27 mm), and about 15 mils to about 35 mils (about 0.38 to about 0.89 mm). In various embodiments, each of the layers, such as the skin and core layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm).

Although many of the embodiments described below refer to the polymer resin as being PVB, it would be understood by one of ordinary skill in the art that the polymer may be any polymer suitable for use in a multiple layer panel. Typical polymers include, but are not limited to, polyvinyl acetals (PVA) (such as poly(vinyl butyral) (PVB) or poly(vinyl isobutyral), an isomer of poly(vinyl butyral) and also referred as PVisoB, aliphatic polyurethane (PU), poly(ethylene-co-vinyl acetate) (EVA), polyvinylchloride (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB and its isomer polyvinyl isobutyral, polyvinyl chloride, ionomers, and polyurethane are suitable polymers generally for interlayers; PVB (including its isomer PVisoB) is particularly suitable.

Polyurethanes can have different hardnesses. An exemplary polyurethane polymer has a Shore A hardness less than 85 per ASTM D-2240. Examples of polyurethane polymers are AG8451 and AG5050, aliphatic isocyanate polyether based polyurethanes having glass transition temperatures less than 20° C. (commercially available from Thermedics Inc. of Woburn, Mass.), EVA polymers (or copolymers) can contain various amounts of vinyl acetate groups. The desirable vinyl acetate content is generally from about 10 to about 90 mol %. EVA with lower vinyl acetate content can be used for sound insulation at low temperatures. The ethylene/carboxylic acid copolymers are generally poly(ethylene-co-methacrylic acid) and poly(ethylene-co-acrylic acid) with the carboxylic acid content from 1 to 25 mole %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers of that are suitable include Surlyn® ionomers resins (commercially available from DuPont of Wilmington, Del.).

Examples of exemplary multilayer interlayer constructs include, but are not limited to. PVB//PVisoB//PVB, where the PVisoB layer comprises two or more resins having different residual hydroxyl and/or residual acetate contents or different polymer compositions; PVC//PVB//PVC. PU//PVB//PU, Ionomer//PVB//Ionomer, ionomer//PU//Ionomer, Ionomer//EVA//Ionomer, where the core layer PVB (including PVisoB), PU or EVA can comprise a single resin having one glass transitions or two or more resins having different glass transitions. Alternatively, the skin and core layers may all be PVB using the same or different starting resins, having the same or different residual hydroxyl and/or residual acetate contents, and the same or different plasticizers. Other combinations of resins and polymers will be apparent to those skilled in the art.

While generally referred to as poly(vinyl acetal) or poly(vinyl butyral), any of the poly(vinyl acetal) resins can include residues of any suitable aldehyde, such as isobutyraldehyde, as previously discussed. In some embodiments, one or more poly(vinyl acetal) resin can include residues of at least one $C_1$ to $C_{10}$ aldehyde, or at least one $C_4$ to $C_8$ aldehyde. Examples of suitable $C_4$ to $C_8$ aldehydes can include, but are not limited to, n-butyraldehyde, isobutyraldehyde, 2-methylvaleraldehyde, n-hexyl aldehyde, 2-ethylhexyl aldehyde, n-octyl aldehyde, and combinations thereof. At least one of the first and second poly(vinyl acetal) resins can include at least about 20, at least about 30, at least about 40, at least about 50, at least about 60, or at least about 70 weight percent of residues of at least one $C_4$ to $C_8$ aldehyde, based on the total weight of aldehyde residues of the resin, and/or can include not more than about 90, not more than about 85, not more than about 80, not more than about 75, not more than about 70, or not more than about 65 weight percent of at least one $C_4$ to $C_8$ aldehyde, or in the range of from about 20 to about 90, about 30 to about 80, or about 40 to about 70 weight percent of at least one $C_4$ to $C_8$ aldehyde. The $C_4$ to $C_8$ aldehyde may be selected from the group listed above, or it can be selected from the group consisting of n-butyraldehyde, isobutyraldehyde, 2-ethylhexyl aldehyde, and combinations thereof.

In various embodiments, one or more poly(vinyl acetal) resin may be a poly(vinyl butyral) (PVB) resin. In other embodiments, one or more poly(vinyl acetal) resin can be a poly(vinyl butyral) resin that mainly comprises residues of n-butyraldehyde, and may, for example, include not more than about 50, not more than about 40, not more than about 30, not more than about 20, not more than about 10, not more than about 5, or not more than about 2 weight percent of residues of an aldehyde other than butyraldehyde, based on the total weight of all aldehyde residues of the resin.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film.

Generally, as used herein, a polymer film is thinner than a polymer sheet, such as from about 0.001 to 0.2 mm thick.

The interlayers of the present disclosure will most commonly be utilized in multiple layer panels comprising two substrates, such as a pair of glass sheets (or other rigid materials, such as polycarbonate or acrylic, known in the art), with the interlayers disposed between the two substrates. An example of such a construct would be: (glass)// (polymer interlayer sheet)//(glass), where the polymer interlayer sheet can comprise multilayered interlayers, as noted above, and wherein the core layer of the multilayer interlayer can comprise a single resin, or comprises a first resin and a second resin having higher residual hydroxyl content, and at least one high refractive index plasticizer such that a transparent multiple layer panel having excellent clarity, or high % $T_{vis}$ or minimal haze is created. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 180 psig and 200 psig for about 30 to 90 minutes. The actual steps, as well as the times and temperatures, may vary as necessary, as known by one skilled in the art.

Other means for use in de-airing of the interlayer-glass interfaces (steps 2-5) known in the art and that are commercially practiced include vacuum bag and vacuum ring processes in which a vacuum is utilized to remove the air.

Mottle is one measure of optical quality of a laminate. It is seen as texture or graininess and is considered a visual defect if the level of mottle is too high or too severe (and thus objectionable). As previously discussed, mottle is assessed and categorized by a side-to-side qualitative comparison of the shadowgraph projections for a test laminate with a set of standard laminate shadowgraphs representing a series or scale of mottle values ranging from 1 to 4, with 1 representing a standard of low mottle (i.e., a low number of disruptions) and 4 representing a standard of high mottle (i.e., a high number of disruptions). High mottle is generally considered optically objectionable, particularly in glass panels such as windshields. Optionally, a laminate having a single layer interlayer with zero mottle (or no mottle) is used to facilitate the evaluation of mottle in the test laminate with a mottle rating lower than the scale of the standard set, such as lower than a rating of 1. The test laminate that shows a shadowgraph projection similar to that of a "zero" mottle laminate is assessed to have a mottle rating of zero (0). For samples described and measured herein, the mottle was measured by a Clear Mottle Analyzer (CMA). The Clear Mottle Analyzer consists of a Xenon arc lamp, sample holder, projection screen and camera, as disclosed in U.S. Patent Publication No. 20120133764 A1, the entire disclosure of which is incorporated by reference herein. The Xenon arc lamp is used to project a shadowgraph of the laminate sample onto the screen. The camera captures an image of the shadowgraph which can then be analyzed to determine the level of mottle. The level of mottle is assigned based on the calibration using a set of standard laminate shadowgraphs representing a series scale of mottle values ranging from 0 to 4.

The refractive index (RI) was measured in accordance with ASTM D542. The reported RI values were obtained at a wavelength of 589 nm and at 25° C.

The glass transition temperature ($T_g$) was determined by dynamical mechanical thermal analysis (DMTA). The DMTA measures the storage (elastic) modulus (G') in Pascals, loss (viscous) modulus (G") in Pascals, tan delta (=G"/G') of the specimen as a function of temperature at a given oscillation frequency, and temperature sweep rate. DMTA with an oscillation frequency of 1 Hz under shear mode and temperature sweep rate of 3° C./min were used herein to measure $T_g$. The $T_g$ is then determined by the position of the tan delta peak on the temperature scale in ° C.

The damping loss factor (q) was measured by Mechanical Impedance Measurement as described in ISO 16940. A laminated glass bar sample of 25 mm wide, 300 mm long, and having a pair of 2.3 mm clear glass is prepared and excited at the center point of the bar by a vibration shaker (Brüel and Kjær). An impedance head (Brüel and Kjær) is used to measure the force to excite the bar to vibrate and the velocity of the vibration and the resultant transfer function is recorded on a National Instrument data acquisition and analysis system. The loss factor at the first vibration mode is calculated using the half-power method. In various embodiments, the interlayers of the present invention have damping loss factor of at least 0.15, at least 0.20, at least 0.25, or at least 0.30.

"Sound transmission loss" (STL) is determined for a laminate of the present invention or comparative panel of fixed dimensions with ASTM E90 (2009) at a fixed temperature of 20° C. A "Reference Panel" of 2.3 mm clear glass//"Reference interlayer"//2.3 mm clear glass is measured to have STL of 31 dB at the coincident frequency (3,150 Hz), wherein the "Reference Interlayer" is produced by mixing and melt-extruding 100 parts poly(vinyl butyral) resin having a residual hydroxyl content of 19 wt. % and a vinyl acetate residue of 2 wt. %, 38 parts by weight of 3GEH plasticizer, and other common additives (as described above). The Reference Interlayer has a thickness of 0.76 mm and a glass transition temperature of 30° C. The multilayer interlayers of the present invention or the comparative multilayer interlayers are also laminated with 2.3 mm clear glass according to the method described above for making the reference (or test) laminated glass panel (having a configuration of 2.3 mm glass//interlayer//2.3 mm glass). The panel has dimensions of 50 cm by 80 cm. The STL of the test panel at the coincident frequency of the "Reference Panel" (e.g., STL at 3,150 Hz) is used to assess the sound insulation property of the panel. In various embodiments, the STL of the glass panel comprising the multilayer interlayer of the present invention is at least about 37 dB, at least about 38 dB, at least about 39 dB, or at least about 40 dB.

The invention also includes the following Embodiments 1 to 17, set forth below.

Embodiment 1 is polymer interlayer comprising: at least one soft layer having a first refractive index, the soft layer comprising a first poly(vinyl acetal) resin having a first residual hydroxyl content and a first residual acetate content, and a first plasticizer; at least one stiffer layer having a second refractive index, the stiffer layer comprising a second poly(vinyl acetal) resin having a second residual hydroxyl content and a second residual acetate content, and a second plasticizer; wherein at least one of the first and second plasticizers is a high refractive index plasticizer having a refractive index of at least about 1.460; wherein the absolute value of the difference between the first refractive index and the second refractive index (delta RI) is less than about 0.010; wherein the difference between the first residual hydroxyl content and the second residual hydroxyl content is at least 2.0 weight percent; and wherein the polymer interlayer has a damping loss factor (q) (as measured by ISO 16940) of at least about 0.15 at 20° C. and a sound transmission loss (STL) (as measured by ASTM E90 (2009) at 20° C.) of at least 37 decibels.

Embodiment 2 is a polymer interlayer including the features of embodiment 1, wherein the difference between the first residual acetate content and the second residual acetate content is less than 2.0 weight percent.

Embodiment 3 is a polymer interlayer including the features of embodiment 1, wherein the difference between the first residual acetate content and the second residual acetate content is at least 2.0 weight percent.

Embodiment 4 is a polymer interlayer comprising: at least one soft layer having a first refractive index, the soft layer comprising a first poly(vinyl acetal) resin having a first residual hydroxyl content and a first residual acetate content, and a first plasticizer; at least one stiffer layer having a second refractive index, the stiffer layer comprising a second poly(vinyl acetal) resin having a second residual hydroxyl content and a second residual acetate content, and a second plasticizer; wherein at least one of the first and second plasticizers is a high refractive index plasticizer having a refractive index of at least about 1.460; wherein the absolute value of the difference between the first refractive index and the second refractive index (delta RI) is less than about 0.010; wherein the difference between the first residual acetate content and the second residual acetate content is at least 2.0 weight percent; and wherein the polymer interlayer has a damping loss factor (n) (as measured by ISO 16940) of at least about 0.15 at 20° C. and a sound transmission loss (STL) (as measured by ASTM E90 (2009) at 20° C.) of at least 37 decibels.

Embodiment 5 is a polymer interlayer including the features of embodiment 4, wherein the difference between the first residual hydroxyl content and the second residual hydroxyl content is less than 2.0 weight percent.

Embodiment 6 is a polymer interlayer including the features of embodiment 4, wherein the difference between the first residual hydroxyl content and the second residual hydroxyl content is at least 2.0 weight percent.

Embodiment 7 is a polymer interlayer comprising: at least one soft layer having a first refractive index, the soft layer comprising a first poly(vinyl acetal) resin having a first residual hydroxyl content and a first residual acetate content, and a first plasticizer; at least one stiffer layer having a second refractive index, the stiffer layer comprising a second poly(vinyl acetal) resin having a second residual hydroxyl content and a second residual acetate content, and a second plasticizer; wherein at least one of the first and second plasticizers is a high refractive index plasticizer having a refractive index of at least about 1.460; wherein the absolute value of the difference between the first refractive index and the second refractive index (delta RI) is less than about 0.010; wherein the difference between the first residual hydroxyl content and the second residual hydroxyl content is at least 2.0 weight percent; wherein the difference between the first residual acetate content and the second residual acetate content is at least 2.0 weight percent; and wherein the polymer interlayer has a damping loss factor (n) (as measured by ISO 16940) of at least about 0.15 at 20° C. and a sound transmission loss (STL) (as measured by ASTM E90 (2009) at 20° C.) of at least 37 decibels.

Embodiment 8 is a polymer interlayer including the features of embodiments 1 to 7, wherein the soft layer of the polymer interlayer has a glass transition temperature ($T_g$) less than 20° C.

Embodiment 9 is a polymer interlayer including the features of embodiments 1 to 8, wherein the high refractive index plasticizer is selected from adipates, epoxides, phthalates, terephthalates, iso-phthalates, benzoates, substituted phenols, and other specialty plasticizers and mixtures thereof.

Embodiment 10 is a polymer interlayer including the features of embodiments 1 to 9, wherein the high refractive index plasticizer comprises an unsaturated aromatic moiety.

Embodiment 11 is a polymer interlayer including the features of embodiments 1 to 10, wherein the difference between the first residual acetate content and the second residual acetate content is at least 2.0 weight percent, and wherein at least one of the first poly(vinyl acetal) resin and the second poly(vinyl acetal) resin has a residual acetate content of at least about 5 wt. %.

Embodiment 12 is a polymer interlayer including the features of embodiments 1 to 11, wherein the first plasticizer comprises a high refractive index plasticizer having a refractive index of at least 1.460.

Embodiment 13 is a polymer interlayer including the features of embodiments 1 to 12, wherein the first plasticizer or the second plasticizer further comprises a plasticizer having a refractive index of less than about 1.450.

Embodiment 14 is a polymer interlayer including the features of embodiments 1 to 13, wherein the soft layer further comprises a third poly(vinyl acetal) resin having a third residual hydroxyl content and a third residual acetate content, and wherein the difference between the first residual acetate content and the third residual acetate content is at least 2.0 weight percent or the difference between the first residual hydroxyl content and the third residual hydroxyl content is at least 2.0 weight percent, or the difference between the first residual acetate content and the third residual acetate content is at least 2.0 weight percent and the difference between the first residual hydroxyl content and the third residual hydroxyl content is at least 2.0 weight percent.

Embodiment 15 is a polymer interlayer including the features of embodiments 1 to 14, wherein the polymer interlayer has at least two different glass transition temperatures ($T_g$) and the difference between two different glass transition temperatures ($T_g$) is at least 3° C.

Embodiment 16 is a polymer interlayer including the features of embodiments 1 to 15, wherein the polymer interlayer has a mottle of less than 1.

Embodiment 17 is a polymer interlayer including the features of embodiments 1 to 16, further comprising a second stiffer layer.

Examples

Exemplary layers and multilayer interlayers comprising the layers of the present disclosure (designated as "Disclosed Layers" in the Tables below) and control or comparative layers (designated as "Comparative Layers" in the Tables below) were produced by mixing and melt-extruding 100 parts poly(vinyl butyral) resins and various amounts of plasticizer, and other common additives (as described above), as shown in the Tables. The layers were then used to construct various multilayered interlayers ("Disclosed Interlayers" and "Comparative Interlayers") as shown in the Tables and as described more fully below.

The improvements (or reduction) in mottle formation in a multilayer interlayer having (or maintaining) good acoustic properties can be most readily appreciated by a comparison of multilayer (trilayer) interlayers having at least one high refractive index plasticizer in a layer to a multilayer interlayer having a layer formed using only a single conventional plasticizer. In some embodiments, the plasticizer has an unsaturated aromatic moiety or group. The Comparative Layers are shown as CL-1 to CL-5, and the Disclosed Layers are shown as DL-1 to DL-45. The Comparative Interlayers are shown as CI-1 to CI-4, and the Disclosed Interlayers are shown as DI-1 to DI-25. As shown and discussed below, these Examples demonstrate that mottle can be significantly reduced and acoustic properties maintained or improved when certain high refractive index plasticizers or mixtures of high refractive index plasticizers are used in at least one of the layers in a multilayer interlayer having resins comprising different residual hydroxyl and/or residual acetate contents.

The resins used in the Tables are PVB resins having residual hydroxyl contents and vinyl acetate contents as shown in the Tables. The high refractive index plasticizers used in the Examples are shown in Table 1 below. The plasticizer name (and abbreviation), the chemical name and the refractive index are shown in Table 1.

TABLE 1

| Plasticizer Name | Chemical Name | Refractive index $(n_D^{25})$ |
|---|---|---|
| 3GEH | Triethylene glycol di-2-ethylhexanoate | 1.442 |
| Benzoflex ™ 9-88 (B9-88) | Dipropylene glycol dibenzoate | 1.528 |
| Benzoflex ™ 1046 (B1046) | 2,2,4-trimethyl-1,3-pentanediol benzoate isobutyrate | 1.492 |
| Benzoflex ™ 2088 (B2088) | Mixture of benzoic acid esters of dipropylene glycol and diethylene glycol | 1.538 |

TABLE 1-continued

| Plasticizer Name | Chemical Name | Refractive index $(n_D^{25})$ |
|---|---|---|
| Benzoflex ™ 131 (B131) | Isodecyl benzoate | 1.488 |
| Benzoflex ™ 181 (B181) | 2-ethylhexyl benzoate | 1.489 |
| Uniplex 400 (U400) | Polypropylene glycol dibenzoate | 1.515-1.520 |
| Benzoflex 354 (B354) | 2,2,4-trimethyl-1,3-pentanediol dibenzoate | 1.529 |
| Benzoflex ™ 284 (B284) | Propylene glycol dibenzoate | 1.544 |
| Benzoflex ™ 2-45 (B2-45) | Diethylene glycol dibenzoate | 1.542 |
| Surfonic ™ N-40 | Nonylphenyl tetraethylene glycol | 1.5 |
| DOP | Dioctyl phthalate | 1.485 |
| DINP | Diisononyl phthalate | 1.485 |
| DOTP | Di-2-ethylhexyl terephthalate | 1.489 |

The last three plasticizers (DOP, DINP and DOTP) in Table 1 have a high refractive index (from 1.485 to 1.489) but are undesirable for multiple layer acoustic interlayers. While these plasticizers are effective in reducing or eliminating the presence of mottle in the multiple layer interlayers, as further discussed below, they cannot be stably formulated into the multilayer interlayer to impart the necessary acoustic performance of glass panels.

Table 2 shows examples of multilayer (trilayer) interlayers (having a skin layer/core layer/skin layer construction) comprising the high refractive index plasticizer, DOTP. The resin used in the skin layers had a residual hydroxyl content of about 19 wt. %, and a residual acetate content of less than 2 wt. %. The resin used in the core layers had a residual hydroxyl content of about 11 wt. %, and a residual acetate content of less than 2 wt. %. The total combined skin layer thickness was 28 mils (0.71 mm), and the core layer thickness was 5 mils (0.13 mm). Over time, the plasticizer exuded from the polymer sheets, resulting in the polymer sheets being under plasticized, which diminished the acoustic performance. The exudation can also cause contamination and handling issues.

TABLE 2

| | Skin layer | | | | | Core Layer | | | | | | |
|---|---|---|---|---|---|---|---|---|---|---|---|---|
| Interlayer No. | PVB sheet no. | PVB sheet | Plasticizer content (phr) | Refractive index of PVB sheet $(n_D^{25})$ | Stability of the PVB sheet | PVB sheet No. | PVB sheet | Plasticer content (phr) | Refractive index of PVB sheet $(n_D^{25})$ | Stability of the PVB sheet | Delta refractive index (skin – core) | Mottle | Interlayer/ laminate stability |
| DI-1 | DL-1 | PVB1 | 38 | 1.490 | exuded | DL-6 | PVB6 | 60 | 1.486 | exuded | 0.004 | <1 | plasticizer exuded |
| DI-2 | DL-2 | PVB2 | 42 | 1.490 | exuded | DL-7 | PVB7 | 70 | 1.487 | exuded | 0.003 | <1 | plasticizer exuded |
| DI-3 | DL-3 | PVB3 | 48 | 1.489 | exuded | DL-8 | PVB8 | 80 | 1.486 | exuded | 0.003 | <1 | plasticizer exuded |
| DI-4 | DL-4 | PVB4 | 54 | 1.489 | exuded | DL-9 | PVB9 | 90 | 1.486 | exuded | 0.003 | <1 | plasticizer exuded |
| DI-5 | DL-5 | PVB5 | 60 | 1.486 | exuded | DL-10 | PVB10 | 100 | 1.486 | exuded | 0.000 | <1 | plasticizer exuded |

Table 2 demonstrates that high refractive index plasticizers need to be carefully selected such that they can be stably formulated in the polymer sheets and between adjacent layers within a multilayer interlayer construct. Although the plasticizer is a high refractive index plasticizer (RI=1.489) and it reduces the level of mottle in the polymer sheets (mottle of all the Disclosed Interlayers are less than 1), it cannot be stably formulated into the interlayers because the plasticizer exuded over time.

Comparative Layers containing a single conventional plasticizer (3GEH) and Disclosed Layers containing a single high refractive index plasticizer (Benzoflex™ 131) having an aromatic moiety were constructed and are shown in Table 3A. The resin used in the layers had a residual hydroxyl content of from about 11 to about 21 wt. % as shown in Table 3A, and a residual acetate content of less than 2 wt. %. These Comparative Layers and Disclosed Layers were then used to construct multilayer interlayers shown as Comparative Interlayers and Disclosed Interlayers in Table 3B. The Comparative and Disclosed Interlayers were then tested for mottle and acoustic performance. Results are shown below in Table 3B.

composition for each layer). CI-1 has a delta RI of 0 between layers, a single glass transition temperature, no mottle (mottle level of 0), little sound damping, and very low or poor sound transmission loss. Comparative Interlayer CI-2, which is a multilayer interlayer, has two glass transition temperatures, each corresponding to the respective layers, and CI-2 has high damping and excellent sound transmission loss. But CI-2 has a high delta RI (0.013) and therefore very high mottle (5), which is objectionable for many interlayers, particularly those used in applications where good optical properties are critical. The Disclosed Interlayers (DI-6 to DI-10) containing a single high refractive index plasticizer having an aromatic moiety provide excellent damping, sound transmission loss and a significantly reduced level of mottle (all less than 1). The STL is equal to that of CI-2, and the damping loss factor is as good as, or in some cases, better than that of CI-2.

Comparative Layers containing a conventional plasticizer (3GEH) and Disclosed Layers containing a mixture of two high refractive index plasticizers (Benzoflex™ 131 and Benzoflex™ 9-88, each containing at least one aromatic moiety) were constructed and are shown in Table 4A. The

TABLE 3A

| PVB Sheet No. | Poly(vinyl butyral) sheet | Residual hydroxyl content (wt. %) | Residual vinyl acetate content (wt. %) | 3GEH content (phr) | Benzoflex ™ 131 content (phr) | Thickness (mils) | Refractive Index of interlayer ($n_D^{25}$) |
|---|---|---|---|---|---|---|---|
| CL-1 | PVB11 | 19 | <2 | 38 | | 14 | 1.477 |
| CL-2 | PVB12 | 19 | <2 | 38 | | 5 | 1.477 |
| CL-3 | PVB13 | 11 | <2 | 75 | | 5 | 1.466 |
| DL-11 | PVB14 | 19 | <2 | | 36 | 14 | 1.491 |
| DL-12 | PVB15 | 19 | <2 | | 38 | 14 | 1.490 |
| DL-13 | PVB16 | 19 | <2 | | 40 | 14 | 1.489 |
| DL-14 | PVB17 | 21 | <2 | | 32 | 14 | 1.491 |
| DL-15 | PVB18 | 21 | <2 | | 35 | 14 | 1.490 |
| DL-16 | PVB19 | 11 | <2 | | 75 | 5 | 1.486 |

The Comparative Layers and Disclosed Layers from Table 3A were used in Comparative Interlayers and Disclosed Interlayers as shown in Table 3B. The delta RI (between the core and skin layers), mottle, glass transition temperature ($T_g$), damping loss factor, and sound transmission loss were measured for the Comparative Interlayers and the Disclosed Interlayers, and results are shown in Table 3B.

resin used in the layers had a residual hydroxyl content of from about 11 to about 19 wt. % as shown in Table 4A, and a residual acetate content of less than 2 wt. %. These Comparative Layers and Disclosed Layers were then used to construct multilayer interlayers shown as Comparative Interlayers and Disclosed Interlayers in Table 4B. The interlayers had a total skin thickness of 28 mils (0.71 mm) and a core

TABLE 3B

| Interlayer No. | Skin layer 1 | Core Layer | Skin layer 2 | Plasticizer | Total plasticizer content in interlayer (phr) | Delta refractive index (skin – core) | Refractive index of interlayer ($n_D^{25}$) | Glass Transition Temperature ($T_g$) of Interlayer (° C.) Skin layer | Glass Transition Temperature ($T_g$) of Interlayer (° C.) Core layer | Mottle | Damping Loss Factor at 20° C. | STL at Reference frequency 3,150 Hz (dB) |
|---|---|---|---|---|---|---|---|---|---|---|---|---|
| CI-1 | PVB11 | PVB12 | PVB11 | 3GEH | 38 | 0.000 | 1.477 | 30 | — | 0 | 0.02 | 31 |
| CI-2 | PVB11 | PVB13 | PVB11 | 3GEH | 42.5 | 0.011 | 1.475 | 35 | 3 | 5 | 0.32 | 40 |
| DI-6 | PVB14 | PVB19 | PVB14 | B131 | 41 | 0.005 | 1.491 | 38 | 8 | 0.5 | 0.35 | 40 |
| DI-7 | PVB15 | PVB19 | PVB15 | B131 | 42.5 | 0.004 | 1.489 | 37 | 5 | 0.6 | 0.31 | n/a |
| DI-8 | PVB16 | PVB19 | PVB16 | B131 | 44.5 | 0.003 | 1.489 | 42 | 4 | 0.8 | 0.39 | n/a |
| DI-9 | PVB17 | PVB19 | PVB17 | B131 | 37 | 0.005 | 1.490 | 41 | 3 | 0.1 | 0.35 | n/a |
| DI-10 | PVB18 | PVB19 | PVB18 | B131 | 40 | 0.004 | 1.490 | 37 | 3 | 0.2 | 0.37 | 40 | n/a = not available

Comparative Interlayer CI-1 is a monolithic PVB interlayer, which would behave in the same manner as a trilayer construction of uniform composition (having the same layer thickness of 5 mils (0.13 mm). The Comparative and Disclosed Interlayers were then tested for mottle and acoustic performance.

TABLE 4A

| PVB Sheet No. | Poly(vinyl butyral) sheet | Residual hydroxyl content (wt. %) | Residual vinyl acetate content (wt. %) | 3GEH content (phr) | Benzoflex™ 9-88 content (phr) | Benzoflex™ 131 content (phr) | Total plasticizer content in each layer (phr) | Ratio of B9-88 to B131 | Refractive index of interlayer ($n_D^{25}$) |
|---|---|---|---|---|---|---|---|---|---|
| CL-1 | PVB11 | 19 | <2 | 38 | | | | | 1.477 |
| CL-2 | PVB12 | 19 | <2 | 38 | | | 38 | | 1.477 |
| CL-3 | PVB13 | 11 | <2 | 75 | | | 75 | | 1.466 |
| DL-17 | PVB20 | 19 | <2 | | 11.4 | 26.6 | 38 | 30/70 | 1.491 |
| DL-18 | PVB21 | 19 | <2 | | 12 | 28 | 40 | 30/70 | 1.493 |
| DL-19 | PVB22 | 19 | <2 | | 12.6 | 29.4 | 42 | 30/70 | 1.493 |
| DL-20 | PVB23 | 11 | <2 | | 22.8 | 53.2 | 76 | 30/70 | 1.490 |
| DL-21 | PVB24 | 11 | <2 | | 24.0 | 56.0 | 80 | 30/70 | 1.492 |
| DL-22 | PVB25 | 11 | <2 | | 25.2 | 58.8 | 84 | 30/70 | 1.492 |

TABLE 4B

| Interlayer No. | Skin layer 1 | Core Layer | Skin layer 2 | Plasticizer 1 | Plasticizer 2 | Total plasticizer content in interlayer (phr) | Delta refractive index (skin − core) | Refractive index of interlayer ($n_D^{25}$) | Glass Transition Temperature ($T_g$) of Interlayer (° C.) Skin layer | Glass Transition Temperature ($T_g$) of Interlayer (° C.) Core layer | Mottle | Damping Loss Factor at 20° C. |
|---|---|---|---|---|---|---|---|---|---|---|---|---|
| CI-1 | PVB11 | PVB12 | PVB11 | 3GEH | | 38 | 0.000 | 1.477 | 30 | — | 0 | 0.02 |
| CI-2 | PVB11 | PVB13 | PVB11 | 3GEH | | 42.5 | 0.011 | 1.475 | 35 | 3 | 5 | 0.32 |
| DI-11 | PVB20 | PVB23 | PVB20 | B-9-88 | B-131 | 43 | 0.001 | 1.492 | 35.2 | 10.3 | 0.4 | 0.25 |
| DI-12 | PVB21 | PVB24 | PVB21 | B-9-88 | B-131 | 45 | 0.001 | 1.492 | 33.6 | 8.3 | 0.3 | 0.31 |
| DI-13 | PVB22 | PVB25 | PVB22 | B-9-88 | B-131 | 47 | 0.001 | 1.490 | 36.8 | 7.1 | 0.2 | 0.35 |

Table 4B demonstrates that interlayers having both excellent damping and optical performance (low mottle) can be produced with a mixture of two high refractive index plasticizers. There was no plasticizer exudation, demonstrating that these plasticizers can be stably formulated in the interlayers. As shown in Table 4B, as plasticizer level is increased, the damping loss factor also increases. Compare, for example, Disclosed Interlayers DI-11 to DI-13 where total plasticizer level increases from 43 to 45 to 47 phr and the damping loss factor (at 20° C.) increases from 0.25 to 0.31 to 0.35.

Comparative Layers containing a conventional plasticizer (3GEH) and Disclosed Layers containing a mixture of a conventional plasticizer (3GEH) and a high refractive index plasticizer (Benzoflex™ 354) were constructed and are shown in Table 5A. The resin used in the layers had a residual hydroxyl content of from about 11 to about 20.4 wt. % as shown in Table 5A, and a residual acetate content of less than 2 wt. %. These Comparative Layers and Disclosed Layers were then used to construct multilayer interlayers shown as Comparative Interlayers and Disclosed Interlayers in Table 5B. The interlayers had a total skin thickness of 28 mils (0.71 mm) and a core thickness of 5 mils (0.13 mm). The Comparative and Disclosed Interlayers were then tested for mottle and acoustic performance.

The Examples in Table 5A and Table 5B are similar to previous Examples except that a mixture of one conventional plasticizer and one high refractive index plasticizer are used to construct the layers to be used in the multilayer interlayers to demonstrate the effect of a blend of a conventional and a high refractive index plasticizer. In these Examples, the plasticizer contents in the skin and core layers are maintained constant for all Disclosed Interlayers while the ratio of the conventional plasticizer to the high refractive index plasticizer is varied.

TABLE 5A

| PVB Sheet No. | Poly(vinyl butyral) sheet | Residual hydroxyl content (wt. %) | Residual vinyl acetate content (wt. %) | 3GEH content (phr) | Benzoflex™ 354 Content (phr) | Total plasticizer content in each layer (phr) | Ratio of B354 to 3GEH | Refractive index of interlayer ($n_D^{25}$) |
|---|---|---|---|---|---|---|---|---|
| CL-1 | PVB11 | 19 | <2 | 38 | | | | 1.477 |
| CL-2 | PVB12 | 19 | <2 | 38 | | | | 1.477 |
| CL-3 | PVB13 | 11 | <2 | 75 | | | | 1.466 |
| DL-23 | PVB26 | 20.4 | <2 | 30.1 | 12.9 | 43 | 30/70 | 1.484 |
| DL-24 | PVB27 | 20.4 | <2 | 25.8 | 17.2 | 43 | 40/60 | 1.485 |
| DL-25 | PVB28 | 20.4 | <2 | 21.5 | 21.5 | 43 | 50/50 | 1.488 |
| DL-26 | PVB29 | 11 | <2 | 59.5 | 25.5 | 85 | 30/70 | 1.479 |
| DL-27 | PVB30 | 11 | <2 | 51 | 34 | 85 | 40/60 | 1.481 |
| DL-28 | PVB31 | 11 | <2 | 42.5 | 42.5 | 85 | 50/50 | 1.486 |

TABLE 5B

| Interlayer No. | Skin layer 1 | Core Layer | Skin layer 2 | Plasticizer 1 | Plasticizer 2 | Total plasticizer content in interlayer (phr) | Delta RI (skin − core) | Refractive index of interlayer ($n_D^{25}$) | Glass Transition Temperature ($T_g$) of Interlayer (° C.) Skin layer | Glass Transition Temperature ($T_g$) of Interlayer (° C.) Core layer | Mottle | Damping Loss Factor at 20° C. | STL at Reference frequency 3,150 Hz (dB) |
|---|---|---|---|---|---|---|---|---|---|---|---|---|---|
| CI-1 | PVB11 | PVB12 | PVB11 | 3GEH | | 38 | 0.000 | 1.477 | 30 | — | 0 | 0.02 | 31 |
| CI-2 | PVB11 | PVB13 | PVB11 | 3GEH | | 42.5 | 0.011 | 1.475 | 35 | 3 | 5 | 0.32 | 40 |
| DI-14 | PVB26 | PVB29 | PVB26 | 3GEH | B-354 | 48 | 0.005 | 1.484 | 38.8 | 2.6 | 0.4 | 0.41 | 40 |
| DI-15 | PVB27 | PVB30 | PVB27 | 3GEH | B-354 | 48 | 0.004 | 1.486 | 39.6 | 4.7 | 0.4 | 0.39 | 39 |
| DI-16 | PVB28 | PVB31 | PVB28 | 3GEH | B-354 | 48 | 0.002 | 1.488 | 40.9 | 8.7 | 0.4 | 0.33 | 37 |

Table 5B shows the effect of a mixture of a conventional plasticizer and a high refractive index plasticizer in a core layer of a multilayer interlayer. As shown by the Disclosed Interlayers in Table 5B, a mixture of a conventional plasticizer and a high refractive index plasticizer can also be successfully used to produce multilayer interlayers having reduced or eliminated optical defects such as mottle while providing excellent acoustic performance for noise reduction. As the ratio of the high refractive index plasticizer to conventional plasticizer increased, the mottle in Disclosed Interlayers DI-14 to DI-16 remained very low (mottle of 0.4), but the glass transition temperature of the core increased and the sound damping loss factor decreased. Disclosed Interlayer DI-14, which has a plasticizer ratio of 30/70 (B254/3GEH), had an equivalent STL to CI-2, and DI-16, which has a plasticizer ratio of 50/50 (B354/3GEH) and therefore a higher level of the high RI plasticizer, has a slightly lower STL than CI-2, but is still acceptable. The Examples in Table 5B demonstrate that multilayer interlayers can be stably formulated with a blend of a conventional plasticizer and a high refractive index plasticizer.

Comparative Layers containing a conventional plasticizer (3GEH) and Disclosed Layers containing a mixture of a conventional plasticizer (3GEH) and a high refractive index plasticizer (Benzoflex™ 9-88) were constructed and are shown in Table 6A. The resin used in the layers had a residual hydroxyl content of from about 11 to about 19 wt. % as shown in Table 6A, and a residual acetate content of less than 2 wt. %. These Comparative Layers and Disclosed Layers were then used to construct multilayer interlayers shown as Comparative Interlayers and Disclosed Interlayers in Table 6B. The interlayers had a total skin thickness of 28 mils (0.71 mm) and a core thickness of 5 mils (0.13 mm). The Comparative and Disclosed Interlayers were then tested for mottle and acoustic performance.

Table 6A and Table 6B are also similar to previous tables except that a mixture of one conventional plasticizer and a different high refractive index plasticizer are used to construct the layers to be used in the multilayer interlayers. The plasticizer content in the skin and core layers is varied for all Disclosed Interlayers while the ratio of the conventional plasticizer to the high refractive index plasticizer was maintained constant. The effect of varying plasticizer content on mottle and acoustic performance is shown in Table 6B.

TABLE 6A

| PVB Sheet No. | Poly(vinyl butyral) sheet | Residual hydroxyl content (wt. %) | Residual vinyl acetate content (wt. %) | 3GEH content (phr) | Benzoflex ™ 9-88 content (phr) | Total plasticizer content in each layer (phr) | Ratio of B9-88 to 3GEH | Refractive Index of interlayer ($n_D^{25}$) |
|---|---|---|---|---|---|---|---|---|
| CL-1 | PVB11 | 19 | <2 | 38 | | | | 1.477 |
| CL-2 | PVB12 | 19 | <2 | 38 | | | | 1.477 |
| CL-3 | PVB13 | 11 | <2 | 75 | | | | 1.466 |
| DL-29 | PVB32 | 19 | <2 | 18 | 18 | 36 | 50/50 | 1.489 |
| DL-30 | PVB33 | 19 | <2 | 20 | 20 | 40 | 50/50 | 1.488 |
| DL-31 | PVB34 | 19 | <2 | 22 | 22 | 44 | 50/50 | 1.488 |
| DL-32 | PVB35 | 11 | <2 | 36 | 36 | 72 | 50/50 | 1.484 |
| DL-33 | PVB36 | 11 | <2 | 40 | 40 | 80 | 50/50 | 1.485 |
| DL-34 | PVB37 | 11 | <2 | 44 | 44 | 88 | 50/50 | 1.486 |

TABLE 6B

| Interlayer No. | Skin layer 1 | Core Layer | Skin layer 2 | Plasticizer 1 | Plasticizer 2 | Total plasticizer content in interlayer (phr) | Delta RI (skin − core) | Refractive index of interlayer ($n_D^{25}$) | Glass Transition Temperature ($T_g$) of Interlayer (° C.) Skin layer | Glass Transition Temperature ($T_g$) of Interlayer (° C.) Core layer | Mottle | Damping Loss Factor at 20° C. | STL at Reference frequency 3,150 Hz (dB) |
|---|---|---|---|---|---|---|---|---|---|---|---|---|---|
| CI-1 | PVB11 | PVB12 | PVB11 | 3GEH | | 38 | 0.000 | 1.477 | 30 | — | 0 | 0.02 | 31 |
| CI-2 | PVB11 | PVB13 | PVB11 | 3GEH | | 42.5 | 0.011 | 1.475 | 35 | 3 | 5 | 0.32 | 40 |

TABLE 6B-continued

| Interlayer No. | Skin layer 1 | Core Layer | Skin layer 2 | Plasticizer 1 | Plasticizer 2 | Total plasticizer content in interlayer (phr) | Delta RI (skin − core) | Refractive index of interlayer ($n_D^{25}$) | Glass Transition Temperature ($T_g$) of Interlayer (° C.) Skin layer | Core layer | Mottle | Damping Loss Factor at 20° C. | STL at Reference frequency 3,150 Hz (dB) |
|---|---|---|---|---|---|---|---|---|---|---|---|---|---|
| DI-17 | PVB32 | PVB35 | PVB32 | 3GEH | B-9-88 | 40.5 | 0.005 | 1.488 | 36.6 | 9.7 | 0.8 | 0.30 | 39 |
| DI-18 | PVB33 | PVB36 | PVB33 | 3GEH | B-9-88 | 45 | 0.003 | 1.487 | 34.2 | 7.9 | 0.6 | 0.40 | 39 |
| DI-19 | PVB34 | PVB37 | PVB34 | 3GEH | B-9-88 | 49 | 0.002 | 1.488 | 34.8 | 6.4 | 0.5 | 0.42 | n.a |

Table 6B demonstrates the effect of varying plasticizer content in a layer of a multilayer interlayer on mottle and acoustic performance. As the total amount (phr) of plasticizer in the multilayer interlayer increased, the glass transition temperature of the core decreased, the mottle level of the interlayer improved, and the sound damping loss increased.

Comparative Layers containing a conventional plasticizer (3GEH) and Disclosed Layers containing a mixture of a conventional plasticizer (3GEH) and a different high refractive index plasticizer (Benzoflex™ 2088, Uniplex 400, Benzoflex™ 284 or Surfonic™ N-40) were constructed and are shown in Table 7A. The resin used in the layers had a residual hydroxyl content of from about 11 to about 19 wt. % as shown in Table 7A, and a residual acetate content of less than 2 wt. %. These Comparative Layers and Disclosed Layers were then used to construct multilayer interlayers shown as Comparative Interlayers and Disclosed Interlayers in Table 7B. The interlayers had a total skin thickness of 28 mils (0.71 mm) and a core thickness of 5 mils (0.13 mm). The Comparative and Disclosed Interlayers were then tested for mottle and acoustic performance.

Table 7A and Table 7B are also similar to previous tables with a mixture of one conventional plasticizer and different high refractive index plasticizers used to construct the layers to be used in the multilayer interlayers. The plasticizer content in the skin and core layers varied for the Disclosed Interlayers.

TABLE 7A

| PVB Sheet No. | Poly(vinyl butyral) sheet | Residual hydroxyl content (wt. %) | Residual vinyl acetate content (wt. %) | 3GEH content (phr) | Benzoflex™ 2088 Content (phr) | Uniplex 400 content (phr) | Benzoflex™ 284 Content (phr) | Surfonic™ N-40 content (phr) | Total plasticizer content in each layer (phr) | Refractive index of interlayer ($n_D^{25}$) |
|---|---|---|---|---|---|---|---|---|---|---|
| CL-1 | PVB11 | 19 | <2 | 38 | | | | | 38 | 1.477 |
| CL-2 | PVB12 | 19 | <2 | 38 | | | | | 38 | 1.477 |
| CL-3 | PVB13 | 11 | <2 | 75 | | | | | 75 | 1.466 |
| DL-35 | PVB38 | 19 | <2 | 20 | 20 | | | | 40 | 1.49 |
| DL-36 | PVB39 | 11 | <2 | 40 | 42 | | | | 82 | 1.49 |
| DL-37 | PVB40 | 19 | <2 | 16 | | 24 | | | 40 | 1.489 |
| DL-38 | PVB41 | 11 | <2 | 32 | | 48 | | | 80 | 1.485 |
| DL-39 | PVB42 | 19 | <2 | 20.5 | | | 20.5 | | 41 | 1.492 |
| DL-40 | PVB43 | 11 | <2 | 41 | | | 41 | | 82 | 1.489 |
| DL-41 | PVB44 | 19 | <2 | 26 | | | | 9 | 35 | 1.483 |
| DL-42 | PVB45 | 11 | <2 | 55 | | | | 20 | 75 | 1.477 |

TABLE 7B

| Interlayer No. | Skin layer 1 | Core Layer | Skin layer 2 | Plasticizer 1 | Plasticizer 2 | Total plasticizer content in interlayer (phr) | Delta refractive index (skin − core) | Refractive index of interlayer ($n_D^{25}$) | Glass Transition Temperature ($T_g$) of Interlayer (° C.) Skin layer | Core layer | Mottle | Damping Loss Factor at 20° C. | STL at Reference frequency 3,150 Hz (dB) |
|---|---|---|---|---|---|---|---|---|---|---|---|---|---|
| CI-1 | PVB11 | PVB12 | PVB11 | 3GEH | | 38 | 0.000 | 1.477 | 30 | — | 0 | 0.02 | 31 |
| CI-2 | PVB11 | PVB13 | PVB11 | 3GEH | | 42.5 | 0.011 | 1.475 | 35 | 3 | 5 | 0.32 | 40 |
| DI-20 | PVB38 | PVB39 | PVB38 | 3GEH | B2088 | 45 | 0 | 1.491 | 34 | 9.3 | 0.2 | 0.28 | n/a |
| DI-21 | PVB40 | PVB41 | PVB40 | 3GEH | U400 | 45 | 0.004 | 1.488 | 35.8 | 12.1 | 0.4 | 0.17 | n/a |
| DI-22 | PVB42 | PVB43 | PVB42 | 3GEH | B284 | 46 | 0.003 | 1.490 | 34.8 | 8.3 | 0.4 | 0.26 | n/a |
| DI-23 | PVB44 | PVB45 | PVB44 | 3GEH | N-40 | 40 | 0.006 | 1.482 | 38.4 | 4.6 | 0.9 | 0.40 | 39 |

Table 7B shows that multilayer interlayers having core layers comprising mixtures of different high refractive index plasticizers and a conventional plasticizer instead of only a conventional plasticizer in a multilayer interlayer can dramatically reduce the mottle in the interlayer. The type of high refractive index plasticizer in the mixture of plasticizers used in constructing multilayer interlayer impacts the level of mottle, damping, and STL in the final interlayer construction.

Table 8A and Table 8B show examples of multilayer interlayers having a core layer containing resins having different residual acetate contents (varying from less than 2 wt. % to 12 wt. % and 18 wt. %) in combination with a high refractive index plasticizer (the Disclosed Layers). The Comparative Layers contain conventional plasticizers. The interlayers had a total skin thickness of 28 mils (0.71 mm) and a core thickness of 5 mils (0.13 mm).

TABLE 8A

| PVB Sheet No. | Poly(vinyl butyral) sheet | Residual hydroxyl content (wt. %) | Residual vinyl acetate content (wt. %) | 3GEH content (phr) | Benzoflex™ 131 content (phr) | Total plasticizer content in each layer (phr) | Refractive Index ($n_D^{25}$) |
|---|---|---|---|---|---|---|---|
| CL-1 | PVB11 | 19 | <2 | 38 | | | 1.477 |
| CL-2 | PVB12 | 19 | <2 | 38 | | | 1.477 |
| CL-3 | PVB13 | 11 | <2 | 75 | | | 1.466 |
| CL-4 | PVB46 | 12 | 18 | 75 | | 75 | 1.465 |
| CL-5 | PVB47 | 12 | 12 | 75 | | 75 | 1.466 |
| DL-43 | PVB15 | 19 | <2 | | 38 | 38 | 1.490 |
| DL-44 | PVB48 | 12 | 18 | | 75 | 75 | 1.487 |
| DL-45 | PVB49 | 12 | 12 | | 75 | 75 | 1.488 |

TABLE 8B

| Interlayer No. | Skin layer 1 | Core Layer | Skin layer 2 | Plasticizer | Total plasticizer content in interlayer (phr) | Delta refractive index (skin − core) | Glass Transition Temperature ($T_g$) of Interlayer (° C.) Skin layer | Glass Transition Temperature ($T_g$) of Interlayer (° C.) Core layer | Mottle | Damping Loss Factor at 20° C. |
|---|---|---|---|---|---|---|---|---|---|---|
| CI-1 | PVB11 | PVB12 | PVB11 | 3GEH | 38 | 0.000 | 30 | — | 0 | 0.02 |
| CI-2 | PVB11 | PVB13 | PVB11 | 3GEH | 42.5 | 0.011 | 30 | −2 | 5 | 0.32 |
| CI-3 | PVB11 | PVB46 | PVB11 | 3GEH | 42.5 | 0.012 | 30 | −4 | 5 | 0.36 |
| CI-4 | PVB11 | PVB47 | PVB11 | 3GEH | 42.5 | 0.011 | 30 | −3 | 5 | 0.31 |
| DI-24 | PVB15 | PVB48 | PVB15 | B131 | 42.5 | 0.003 | 36.8 | −2 | <1 | 0.48 |
| DI-25 | PVB15 | PVB49 | PVB15 | B131 | 42.5 | 0.002 | 36 | −2 | <1 | 0.53 |

Table 8B shows that Comparative Interlayers (CI-3 and CI-4) having a core layer comprising a high residual vinyl acetate content resin composition can produce interlayers having excellent damping, similar to that of Comparative Interlayer CI-2 (having a low residual vinyl acetate content resin), but all of the multilayer Comparative Interlayers (CI-2, CI-3, CI-4) have very high mottle (5). Conversely, the Disclosed Interlayers have excellent damping and very low mottle when a high refractive index plasticizer is used instead of a conventional plasticizer, despite the higher residual acetate content in the core layer resin.

The above Examples show that the plasticizer, or mixture of plasticizers, can be selected to tailor the properties of a polymer layer or layers, such as a core and/or skin layer(s), and therefore of a multilayer interlayer, to have a stable multilayer interlayer (i.e., no plasticizer exudation) having improved or lower levels of mottle while maintaining good levels of acoustic performance. As shown by the Examples above, multilayer interlayers having a layer comprising a single plasticizer that is selected from high refractive index plasticizers, and in some cases, high refractive index plasticizers having an aromatic moiety (such as benzoates), when used in a layer of a multilayer interlayer, provides an interlayer having a slightly higher glass transition temperature in the core but still having good acoustic performance and significantly better (lower) mottle (see Table 3B).

A similar trend is observed when a blend of two high refractive index plasticizers are used (see Table 4B). When a mixture of a conventional plasticizer and a high refractive index plasticizer are used in a layer(s), the multilayer interlayers have lower glass transition temperatures than when a mixture of two high refractive index plasticizers are used, but the low mottle and good acoustic performance are maintained (See Table 5B). Depending on the plasticizer ratio in layers having blends of plasticizers, performance varied.

In conclusion, the multilayered interlayers with layers comprising at least one high refractive index plasticizer, such as plasticizers having an unsaturated aromatic moiety or group described herein, either alone or with a conventional plasticizer (non-high refractive index plasticizer) have numerous advantages over conventional multilayered interlayers previously utilized in the art. In general, in comparison to multilayered interlayers previously utilized in the art, the multilayered interlayers comprising layers and plasticizers as described herein have improved optical properties, specifically in the form of lower mottle, while maintaining good acoustic properties. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. A polymer interlayer comprising:
   at least one soft layer having a first refractive index, the soft layer comprising a first poly(vinyl acetal) resin having a first residual hydroxyl content and a first residual acetate content, and a first plasticizer;
   at least one stiffer layer having a second refractive index, the stiffer layer comprising a second poly(vinyl acetal) resin having a second residual hydroxyl content and a second residual acetate content, and a second plasticizer;
   wherein at least one of the first and second plasticizers is a high refractive index plasticizer having a refractive index of at least about 1.460;
   wherein the absolute value of the difference between the first refractive index and the second refractive index (delta RI) is less than about 0.010;
   wherein the difference between the first residual hydroxyl content and the second residual hydroxyl content is at least 2.0 weight percent; and
   wherein the polymer interlayer has a damping loss factor (η) (as measured by ISO 16940) of at least about 0.15 at 20° C. and a sound transmission loss (STL) (as measured by ASTM E90 (2009) at 20° C.) of at least 37 decibels.

2. The polymer interlayer of claim 1, wherein the soft layer of the polymer interlayer has a glass transition temperature ($T_g$) less than 20° C.

3. The polymer interlayer of claim 1, wherein the high refractive index plasticizer is selected from adipates, epoxides, phthalates, terephthalates, iso-phthalates, benzoates, substituted phenols, and other specialty plasticizers and mixtures thereof.

4. The polymer interlayer of claim 1, wherein the high refractive index plasticizer comprises an unsaturated aromatic moiety.

5. The polymer interlayer of claim 1, wherein the difference between the first residual acetate content and the second residual acetate content is less than 2.0 weight percent.

6. The polymer interlayer of claim 1, wherein the difference between the first residual acetate content and the second residual acetate content is at least 2.0 weight percent, and wherein at least one of the first poly(vinyl acetal) resin and the second poly(vinyl acetal) resin has a residual acetate content of at least about 4 wt. %.

7. The polymer interlayer of claim 1, wherein the first plasticizer comprises a high refractive index plasticizer having a refractive index of at least 1.460.

8. The polymer interlayer of claim 1, wherein the first plasticizer or the second plasticizer further comprises a plasticizer having a refractive index of less than about 1.450.

9. The polymer interlayer of claim 1, wherein the soft layer further comprises a third poly(vinyl acetal) resin having a third residual hydroxyl content and a third residual acetate content, and wherein the difference between the first residual acetate content and the third residual acetate content is at least 2.0 weight percent or the difference between the first residual hydroxyl content and the third residual hydroxyl content is at least 2.0 weight percent, or the difference between the first residual acetate content and the third residual acetate content is at least 2.0 weight percent and the difference between the first residual hydroxyl content and the third residual hydroxyl content is at least 2.0 weight percent.

10. The polymer interlayer of claim 1, wherein the polymer interlayer has at least two different glass transition temperatures ($T_g$) and the difference between two different glass transition temperatures ($T_g$) is at least 3° C.

11. The polymer interlayer of claim 1, wherein the polymer interlayer has a mottle of less than 1.

12. The polymer interlayer of claim 1, further comprising a second stiffer layer.

13. A polymer interlayer comprising:
   at least one soft layer having a first refractive index, the soft layer comprising a first poly(vinyl acetal) resin having a first residual hydroxyl content and a first residual acetate content, and a first plasticizer;
   at least one stiffer layer having a second refractive index, the stiffer layer comprising a second poly(vinyl acetal) resin having a second residual hydroxyl content and a second residual acetate content, and a second plasticizer;
   wherein at least one of the first and second plasticizers is a high refractive index plasticizer having a refractive index of at least about 1.460;
   wherein the absolute value of the difference between the first refractive index and the second refractive index (delta RI) is less than about 0.010;
   wherein the difference between the first residual acetate content and the second residual acetate content is at least 2.0 weight percent; and
   wherein the polymer interlayer has a damping loss factor (η) (as measured by ISO 16940) of at least about 0.15 at 20° C. and a sound transmission loss (STL) (as measured by ASTM E90 (2009) at 20° C.) of at least 37 decibels.

14. The polymer interlayer of claim 13, wherein the soft layer of the polymer interlayer has a glass transition temperature ($T_g$) less than 20° C., and wherein the polymer interlayer has at least two different glass transition temperatures ($T_g$) and the difference between two different glass transition temperatures ($T_g$) is at least 3° C.

15. The polymer interlayer of claim 13, wherein the difference between the first residual hydroxyl content and the second residual hydroxyl content is less than 2.0 weight percent.

16. The polymer interlayer of claim 13, wherein the difference between the first residual hydroxyl content and the second residual hydroxyl content is at least 2.0 weight percent.

17. The polymer interlayer of claim 13, wherein the soft layer further comprises a third poly(vinyl acetal) resin having a third residual hydroxyl content and a third residual acetate content, and wherein the difference between the first residual acetate content and the third residual acetate content is at least 2.0 weight percent or the difference between the first residual hydroxyl content and the third residual hydroxyl content is at least 2.0 weight percent, or the difference between the first residual acetate content and the third residual acetate content is at least 2.0 weight percent and the difference between the first residual hydroxyl content and the third residual hydroxyl content is at least 2.0 weight percent.

18. A polymer interlayer comprising:
- at least one soft layer having a first refractive index, the soft layer comprising a first poly(vinyl acetal) resin having a first residual hydroxyl content and a first residual acetate content, and a first plasticizer;
- at least one stiffer layer having a second refractive index, the stiffer layer comprising a second poly(vinyl acetal) resin having a second residual hydroxyl content and a second residual acetate content, and a second plasticizer;
- wherein at least one of the first and second plasticizers is a high refractive index plasticizer having a refractive index of at least about 1.460;
- wherein the absolute value of the difference between the first refractive index and the second refractive index (delta RI) is less than about 0.010;
- wherein the difference between the first residual hydroxyl content and the second residual hydroxyl content is at least 2.0 weight percent;
- wherein the difference between the first residual acetate content and the second residual acetate content is at least 2.0 weight percent; and wherein the polymer interlayer has a damping loss factor (η) (as measured by ISO 16940) of at least about 0.15 at 20° C. and a sound transmission loss (STL) (as measured by ASTM E90 (2009) at 20° C.) of at least 37 decibels.

19. The polymer interlayer of claim 18, wherein the soft layer of the polymer interlayer has a glass transition temperature ($T_g$) less than 20° C., and wherein the polymer interlayer has at least two different glass transition temperatures ($T_g$) and the difference between two different glass transition temperatures ($T_g$) is at least 3° C.

20. The polymer interlayer of claim 18, wherein the soft layer further comprises a third poly(vinyl acetal) resin having a third residual hydroxyl content and a third residual acetate content, and wherein the difference between the first residual acetate content and the third residual acetate content is at least 2.0 weight percent or the difference between the first residual hydroxyl content and the third residual hydroxyl content is at least 2.0 weight percent, or the difference between the first residual acetate content and the third residual acetate content is at least 2.0 weight percent and the difference between the first residual hydroxyl content and the third residual hydroxyl content is at least 2.0 weight percent.

* * * * *